United States Patent
Zheng et al.

(10) Patent No.: US 12,022,548 B2
(45) Date of Patent: Jun. 25, 2024

(54) LINK DETECTION METHOD AND APPARATUS

(71) Applicant: HUAWEI TECHNOLOGIES CO., LTD., Shenzhen (CN)

(72) Inventors: Juan Zheng, Beijing (CN); Chaojun Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 544 days.

(21) Appl. No.: 17/215,406

(22) Filed: Mar. 29, 2021

(65) Prior Publication Data
US 2021/0219369 A1 Jul. 15, 2021

Related U.S. Application Data

(63) Continuation of application No. PCT/CN2019/107067, filed on Sep. 20, 2019.

(30) Foreign Application Priority Data

Sep. 28, 2018 (CN) .......................... 201811142644.9

(51) Int. Cl.
*H04W 76/19* (2018.01)
*H04W 8/24* (2009.01)
(Continued)

(52) U.S. Cl.
CPC ............. *H04W 76/19* (2018.02); *H04W 8/24* (2013.01); *H04W 24/10* (2013.01); *H04W 76/27* (2018.02)

(58) Field of Classification Search
CPC ....... H04W 76/19; H04W 8/24; H04W 24/10; H04W 76/27; H04W 48/12;
(Continued)

(56) References Cited

U.S. PATENT DOCUMENTS 8,989,087 B2 * 3/2015 Lindoff ................. H04W 28/26
370/328
9,271,169 B2 * 2/2016 Chuang ................. H04W 24/04
(Continued)

FOREIGN PATENT DOCUMENTS

CN 103200599 A 7/2013
CN 103747473 A 4/2014
(Continued)

OTHER PUBLICATIONS

3GPP TSG-RAN WG2#59bis,R2-074393,Text Proposal to TS 36.331 about RLF procedure,NEC ,Oct. 8 12, 2007,total 7 pages.
(Continued)

*Primary Examiner* — Inder P Mehra
(74) *Attorney, Agent, or Firm* — Rimon PC

(57) ABSTRACT

A link detection method and an apparatus are provided. The link detection method includes: determining that a first radio link to an access network device fails; detecting a second radio link to the access network device, to determine whether the second radio link fails; and if determining that the second radio link does not fail, communicating with the access network device over the second radio link. If it is determined that the first radio link fails, the second radio link may be further detected. If the second radio link does not fail, the second radio link may continue to be used in communication, and RRC reestablishment does not need to be performed on the first radio link. This reduces an unnecessary RRC reestablishment process, and a terminal device does not need to fall back to an RRC idle state, so that the terminal device can continue to work normally.

16 Claims, 5 Drawing Sheets

(51) Int. Cl.

| | | |
|---|---|---|
| *H04W 24/08* | (2009.01) | |
| *H04W 24/10* | (2009.01) | |
| *H04W 36/00* | (2009.01) | |
| *H04W 36/30* | (2009.01) | |
| *H04W 48/12* | (2009.01) | |
| *H04W 76/15* | (2018.01) | |
| *H04W 76/18* | (2018.01) | |
| *H04W 76/27* | (2018.01) | |

(58) Field of Classification Search
CPC ... H04W 36/305; H04W 76/15; H04W 24/08; H04W 36/0083; H04W 36/30; H04W 76/18
USPC .......................................................... 370/329
See application file for complete search history.

(56) References Cited

U.S. PATENT DOCUMENTS

| | | |
|---|---|---|
| 2013/0021921 A1 | 1/2013 | He et al. |
| 2014/0248882 A1 | 9/2014 | Wang et al. |
| 2015/0131454 A1 | 5/2015 | Wegmann et al. |
| 2016/0029234 A1 | 1/2016 | Zhang et al. |
| 2016/0212680 A1* | 7/2016 | Talukdar ............. H04W 36/305 |
| 2017/0099338 A1* | 4/2017 | Yang ...................... H04L 65/80 |
| 2017/0374705 A1 | 12/2017 | Mitsui et al. |
| 2018/0310205 A1* | 10/2018 | Frenger ................ H04W 76/19 |

FOREIGN PATENT DOCUMENTS

| | | | | |
|---|---|---|---|---|
| CN | 104243122 | A | | 12/2014 |
| CN | 104641683 | A | | 5/2015 |
| CN | 105072029 | A | | 11/2015 |
| CN | 105101459 | A | | 11/2015 |
| CN | 105101459 | A | * | 11/2015 ............ H04W 76/15 |
| CN | 105519166 | A | | 4/2016 |
| CN | 105917699 | A | | 8/2016 |
| CN | 107889133 | A | | 4/2018 |
| CN | 108377577 | A | | 8/2018 |
| EP | 3531791 | A1 | | 8/2019 |
| KR | 20090007481 | A | * | 7/2009 ............... E03C 1/01 |
| WO | WO-2010112074 | A1 | * | 10/2010 ............ H04L 47/10 |
| WO | WO-2017061908 | A1 | * | 4/2017 ............ H04W 24/04 |
| WO | 2018013110 | A1 | | 1/2018 |
| WO | 2018090910 | A1 | | 5/2018 |
| WO | 2018173447 | A1 | | 9/2018 |

OTHER PUBLICATIONS

3GPP TSG-RAN WG2 Meeting #103,R2-1812578, [L200] to [L204] Remaining FFS List for RLF,LG Electronics Inc., Gothenburg, Sweden, Aug 20 24, 2018,total 3 pages.
Chinese Office Action for Application No. 201811142644.9 dated Oct. 9, 2020.
Chinese Office Action for Application No. 201811142644.9 dated Mar. 2, 2021.
International Search Report for Application No. PCT/CN2019/107067 dated Sep. 20, 2019.

* cited by examiner

LINK DETECTION METHOD AND APPARATUS

CROSS-REFERENCE TO RELATED APPLICATIONS

This application is a continuation of International Application No. PCT/CN2019/107067, filed on Sep. 20, 2019, which claims priority to Chinese Patent Application No. 201811142644.9, filed on Sep. 28, 2018. The disclosures of the aforementioned applications are hereby incorporated by reference in their entireties.

TECHNICAL FIELD

This application relates to the field of communications technologies, and in particular, to a link detection method and an apparatus.

BACKGROUND

In a process in which a terminal device communicates with an access network device, the terminal device needs to monitor quality of a radio link in real time, to determine whether normal data communication can be ensured if a current radio link between the terminal device and the access network device is used, or whether a radio link to the current access network device can be kept in a connected state.

For example, the terminal device may detect a radio link failure (RLF) event. If the RLF event is not detected, the terminal device maintains communication with the access network device. If the RLF event is detected, it indicates that quality of a link between the terminal device and the access network device that currently establishes a connection to the terminal device is relatively poor, and the terminal device may perform radio resource control (RRC) reestablishment with the access network device. If the RRC reestablishment fails, the terminal device falls back to an RRC idle state.

A future terminal device may have a plurality of bandwidth capabilities. Even if a radio link fails, the terminal device may continue to work with another bandwidth capability. However, in an existing manner, if a radio link fails, the terminal device performs RRC reestablishment, resulting in an unnecessary RRC reestablishment process. Moreover, the terminal device may fall back to the RRC idle state, and consequently, the terminal device may not work normally.

SUMMARY

Embodiments of this application provide a link detection method and an apparatus, to reduce an unnecessary RRC reestablishment process and simplify implementation of a terminal device.

According to a first aspect, a first link detection method is provided. The method includes: determining that a first radio link to an access network device fails; detecting a second radio link to the access network device, to determine whether the second radio link fails; and if determining that the second radio link does not fail, communicating with the access network device over the second radio link.

The method may be performed by a first communications apparatus. The first communications apparatus may be a terminal device or a communications apparatus that can support a terminal device in implementing functions required in the method. Certainly, the first communications apparatus may alternatively be another communications apparatus, for example, a chip system.

In this embodiment of this application, if it is determined that the first radio link fails, the second radio link may be further detected. If the second radio link does not fail, the second radio link may continue to be used in communication with the access network device, and RRC reestablishment does not need to be performed on the first radio link. This reduces an unnecessary RRC reestablishment process, and a terminal device does not need to fall back to an RRC idle state, so that the terminal device can continue to work normally.

With reference to the first aspect, in a possible implementation of the first aspect, the determining that a first radio link to an access network device fails includes:

if an event that downlink quality of the first radio link is less than a first threshold is detected for N1 or more than N1 times, determining that the first radio link fails; or if a proportion of a quantity of events, detected in timing duration of a first timer, that downlink quality of the first radio link is less than a first threshold in a quantity of events that the downlink quality of the first radio link is detected in the timing duration of the first timer is less than a first proportion threshold, determining that the first radio link fails; or if an event that downlink quality of the first radio link is less than a first threshold is detected for N1 or more than N1 times, and if an event that the downlink quality of the first radio link is greater than a second threshold is detected for less than M1 times, determining that the first radio link fails, where the second threshold is greater than or equal to the first threshold; or if a proportion of a quantity of events, detected in timing duration of a third timer, that downlink quality of the first radio link is less than a first threshold in a quantity of events that the downlink quality of the first radio link is detected in the timing duration of the third timer is greater than or equal to a second proportion threshold, and if an event that the downlink quality of the first radio link is greater than a second threshold is detected for less than M1 times, determining that the first radio link fails; or if an event that downlink quality of the first radio link is less than a first threshold is detected for N1 or more than N1 times, and if a proportion of a quantity of events, detected in timing duration of a fourth timer, that the downlink quality of the first radio link is greater than a second threshold in a quantity of events that the downlink quality of the first radio link is detected in the timing duration of the fourth timer is less than a third proportion threshold, determining that the first radio link fails; or if a proportion of a quantity of events, detected in timing duration of a third timer, that downlink quality of the first radio link is less than a first threshold in a quantity of events that the terminal device detects the downlink quality of the first radio link in the timing duration of the third timer is greater than or equal to a second proportion threshold, and if a proportion of a quantity of events, detected in timing duration of a fourth timer, that the downlink quality of the first radio link is greater than a second threshold in a quantity of events that the downlink quality of the first radio link is detected in the timing duration of the fourth timer is less than a third proportion threshold, determining that the first radio link fails.

The terminal device may determine, in a variety of manners, whether the first radio link between the terminal device and the access network device fails. A specific manner used by the terminal device for determining may be configured by a network device, specified in a protocol, or the like. This is not specifically limited.

With reference to the first aspect, in a possible implementation of the first aspect, the detecting a second radio link to the access network device, to determine whether the second radio link fails includes:

if determining that an event that downlink quality of the second radio link is less than a third threshold is detected for N2 or more than N2 times, determining that the second radio link fails; or if determining that an event that downlink quality of the second radio link is greater than a fourth threshold is detected for less than M2 times, determining that the second radio link fails; or if determining that an event that downlink quality of the second radio link is less than a third threshold is detected for N2 or more than N2 times, and if determining that an event that the downlink quality of the second radio link is greater than a fourth threshold is detected for less than M2 times, determining that the second radio link fails; or if determining that a proportion of a quantity of events, detected in timing duration of a fifth timer, that downlink quality of the second radio link is less than a third threshold in a quantity of events that the terminal device detects the downlink quality of the second radio link in the timing duration of the fifth timer is greater than or equal to a fourth proportion threshold, determining whether the second radio link fails; or if determining that a proportion of a quantity of events, detected in timing duration of a sixth timer, that downlink quality of the second radio link is greater than a fourth threshold in a quantity of events that the terminal device detects the downlink quality of the second radio link in the timing duration of the sixth timer is less than a fifth proportion threshold, determining that the second radio link fails; or determining whether an event that downlink quality of the second radio link is less than a third threshold is detected for N2 or more than N2 times, and if the event that the downlink quality of the second radio link is less than the third threshold occurs for N2 or more than N2 times, and if it is determined that a proportion of a quantity of events, detected in timing duration of an eighth timer, that the downlink quality of the second radio link is greater than a fourth threshold in a quantity of events that the downlink quality of the second radio link is detected in the timing duration of the eighth timer is less than a seventh proportion threshold, determining that the second radio link fails; or determining whether a proportion of a quantity of events, detected in timing duration of a seventh timer, that downlink quality of the second radio link is less than a third threshold in a quantity of events that the terminal device detects the downlink quality of the second radio link in the timing duration of the seventh timer is greater than a sixth proportion threshold, and if the proportion is greater than the sixth proportion threshold, and if it is determined that an event that the downlink quality of the second radio link is greater than a fourth threshold is detected for less than M2 times, determining that the second radio link fails; or determining whether a proportion of a quantity of events, detected in timing duration of a seventh timer, that downlink quality of the second radio link is less than a third threshold in a quantity of events that the terminal device detects the downlink quality of the second radio link in the timing duration of the seventh timer is greater than a sixth proportion threshold, and if the proportion is greater than the sixth proportion threshold, and if it is determined that a proportion of a quantity of events, detected in timing duration of an eighth timer, that the downlink quality of the second radio link is greater than a fourth threshold in a quantity of events that the downlink quality of the second radio link is detected in the timing duration of the eighth timer is less than a seventh proportion threshold, determining that the second radio link fails.

If it is determined that the event that the downlink quality of the second radio link is less than the third threshold is detected for N2 or more than N2 times, and if it is determined that the event that the downlink quality of the second radio link is greater than the fourth threshold is detected for less than M2 times, it is determined that the second radio link fails. It may alternatively be understood as: it is determined whether the event that the downlink quality of the second radio link is less than the third threshold is detected for N2 or more than N2 times, and if it is determined that the event that the downlink quality of the second radio link is less than the third threshold is detected for N2 or more than N2 times, and if it is determined that the event that the downlink quality of the second radio link is greater than the fourth threshold is detected for less than M2 times, it is determined that the second radio link fails.

The terminal device may determine, in a variety of manners, whether the second radio link between the terminal device and the access network device fails. A specific manner used by the terminal device for determining may be configured by a network device, specified in a protocol, or the like. This is not specifically limited.

With reference to the first aspect, in a possible implementation of the first aspect, the third threshold is less than or equal to the first threshold, and/or the fourth threshold is less than or equal to the second threshold; or the third threshold is greater than the first threshold, and/or the fourth threshold is greater than the second threshold.

A second radio link quality assessment mechanism corresponding to the second radio link may be different from a first radio link quality assessment mechanism corresponding to the first radio link. That the first radio link quality assessment mechanism is different from the second radio link quality assessment mechanism may be understood as: values of corresponding H items in at least one item included in the first radio link quality assessment mechanism and values of corresponding H items in at least one item included in the second radio link quality assessment mechanism are different. For example, the first radio link quality assessment mechanism includes the first threshold, the second radio link quality assessment mechanism includes the third threshold corresponding to the first threshold, and the first threshold and the third threshold may be different. A value relationship between the first threshold and the third threshold is related to a parameter used to measure downlink quality, or related to parameters corresponding to values of the first threshold and the third threshold. For example, if both the first threshold and the third threshold are SINR values, the third threshold may be less than or equal to the first threshold, or if both the first threshold and the third threshold are BLER values, the third threshold may be greater than the first threshold. For the second threshold and the fourth threshold, it is the same case. Therefore, the value relationship between the first threshold and the third threshold is not limited in this embodiment of this application. Similarly, a value relationship between the second threshold and the fourth threshold is not limited either.

With reference to the first aspect, in a possible implementation of the first aspect, the downlink quality of the first radio link is downlink quality of the first radio link in K time units, and/or the downlink quality of the second radio link is downlink quality of the second radio link in P time units, where both K and P are positive integers, and K is less than or equal to P.

Values of corresponding H items in at least one item included in the first radio link quality assessment mechanism and values of corresponding H items in at least one item included in the second radio link quality assessment mechanism are different, where H may be equal to 1 or may be greater than 1. In the foregoing case, the H items include an item corresponding to the first threshold (or an item corresponding to the third threshold). In this case, the H items include an item, namely, a quantity of time units. Specific items included in the H items are not limited in this embodiment of this application.

With reference to the first aspect, in a possible implementation of the first aspect, the method further includes: receiving downlink information that is of the second radio link and that is broadcast by the access network device over the first radio link, where the downlink information of the second radio link is used to detect the downlink quality of the second radio link.

When the terminal device determines that the first radio link fails, because the terminal device has already obtained the downlink information of the second radio link in a broadcast manner, the terminal device may not need to send a request message to the access network device to obtain the downlink information of the second radio link. This helps save transmission resources. In addition, because the first radio link has failed in this case, even if the terminal device can send the request message to the access network device, the access network device may fail to send the downlink information of the second radio link to the terminal device over the failed first radio link. Therefore, the access network device broadcasts the downlink information of the second radio link over the first radio link, so that it can be ensured that if losing the first radio link to the access network device, the terminal device can also detect the downlink quality of the second radio link based on the downlink information of the second radio link that is obtained in advance, thereby avoiding an unnecessary RRC reestablishment process or a procedure in which the terminal device enters an RRC idle state.

With reference to the first aspect, in a possible implementation of the first aspect, before the determining that a first radio link to an access network device fails, the method further includes: sending trigger information to the access network device, where the trigger information is used to request to detect the second radio link, or used to request the downlink information of the second radio link.

The terminal device may detect a radio link in a plurality of manners. One of the manners is that after triggering the access network device, the terminal device detects the second radio link between the terminal device and the access network device. If this manner is used, the terminal device needs to send the trigger information to the access network device before detecting the second radio link. For example, the terminal device may send the trigger information to the access network device when determining that the first radio link is about to fail. In this way, the terminal device can detect the second radio link in a relatively timely manner, and can be switched to the second radio link in a timely manner as much as possible when the first radio link fails. In addition, detection on the second radio link may be triggered by the terminal device, so that the terminal device may determine, based on an actual situation, whether to detect the second radio link. Therefore, the detection on the second radio link better meets a requirement of the terminal device.

With reference to the first aspect, in a possible implementation of the first aspect, if it is determined that the second radio link does not fail, the method further includes: sending acknowledgment information to the access network device, where the acknowledgment information is used to indicate that the terminal device is switched from the first radio link to the second radio link, or used to indicate that the terminal device communicates with the access network device over the second radio link.

If the terminal device needs to be switched to the second radio link, the terminal device may notify the access network device, so that the access network device can subsequently communicate with the terminal device over the second radio link, thereby avoiding an information loss caused when the access network device sends information to the terminal device still over the first radio link.

With reference to the first aspect, in a possible implementation of the first aspect, the method further includes: entering an RRC idle state if determining that the second radio link fails; or performing RRC reestablishment with the access network device if determining that the second radio link fails.

In this embodiment of this application, if determining that the second radio link fails, the terminal device may directly enter the RRC idle state, or may perform RRC reestablishment with the access network device. In this case, the second radio link may be reestablished. If reestablishment of the second radio link fails, the terminal device may, for example, enter the RRC idle state again.

With reference to the first aspect, in a possible implementation of the first aspect, the method further includes: sending capability information to the access network device, where the capability information is used to indicate that the terminal device has a capability of detecting the first radio link and a capability of detecting the second radio link, or is used to indicate that the terminal device has a capability of detecting the second radio link.

The terminal device may detect a radio link in a plurality of manners. The access network device may configure a corresponding manner for the terminal device in advance. In this case, the access network device needs to know the capability of the terminal device. Therefore, the terminal device may send the capability information of the terminal device to the access network device, so that the access network device may configure a manner of detecting a radio link for the terminal device based on the capability of the terminal device.

With reference to the first aspect, in a possible implementation of the first aspect, the method further includes: obtaining downlink information of the first radio link if determining that the second radio link does not fail; and detecting the first radio link based on the downlink information of the first radio link.

When communicating with the access network device over the second radio link, the terminal device may need to perform duplicate transmission for a plurality of times to improve coverage. The second radio link is relatively resource-consuming compared with the first radio link. Therefore, if determining that the second radio link does not fail, in addition to maintaining communication with the access network device over the second radio link, the terminal device may further continue to detect the first radio link. Once determining that the first radio link does not fail, the terminal device may be switched to the first radio link again, thereby saving transmission resources as many as possible.

With reference to the first aspect, in a possible implementation of the first aspect, bandwidth of the first radio link is greater than bandwidth of the second radio link.

For example, the first radio link is a wideband link, and the second radio link is a narrowband link. Certainly, this embodiment of this application is not limited thereto. For example, the bandwidth of the first radio link may alternatively be less than or equal to the bandwidth of the second radio link.

According to a second aspect, a second link detection method is provided. The method includes: determining downlink information of a second radio link to a terminal device, where the downlink information of the second radio link is used by the terminal device to detect downlink quality of the second radio link; and broadcasting the downlink information of the second radio link to the terminal device over a first radio link to the terminal device.

The method may be performed by a second communications apparatus. The second communications apparatus may be a network device or a communications apparatus that can support a network device in implementing functions required in the method. Certainly, the second communications apparatus may alternatively be another communications apparatus, for example, a chip system.

With reference to the second aspect, in a possible implementation of the second aspect, the method further includes: receiving acknowledgment information from the terminal device, where the acknowledgment information is used to indicate that the terminal device is switched from the first radio link to the second radio link.

With reference to the second aspect, in a possible implementation of the second aspect, the method further includes: sending downlink information of the first radio link to the terminal device, where the downlink information of the first radio link is used by the terminal device to detect downlink quality of the first radio link.

When communicating with the access network device over the second radio link, the terminal device may need to perform duplicate transmission for a plurality of times to improve coverage. The second radio link is relatively resource-consuming compared with the first radio link. Therefore, if determining that the second radio link does not fail, in addition to maintaining communication with the access network device over the second radio link, the terminal device may further continue to detect the first radio link. In this case, the network device may send the downlink information of the first radio link to the terminal device, so that the terminal device can detect the first radio link.

With reference to the second aspect, in a possible implementation of the second aspect, the method further includes: receiving capability information from the terminal device, where the capability information is used to indicate that the terminal device has a capability of detecting the first radio link and a capability of detecting the second radio link, or is used to indicate that the terminal device has a capability of detecting the second radio link.

With reference to the second aspect, in a possible implementation of the second aspect, the method further includes: receiving trigger information from the terminal device, where the trigger information is used to request to detect the second radio link, or used to request the downlink information of the second radio link.

With reference to the second aspect, in a possible implementation of the second aspect, the method further includes: determining a manner of detecting, by the terminal device, a radio link; and sending configuration information to the terminal device, where the configuration information is used to indicate the manner of detecting a radio link, and the manner of detecting a radio link includes at least one of the following: detecting only the first radio link; detecting the first radio link, and detecting the second radio link after an access network device is triggered; or detecting the first radio link and the second radio link.

With reference to the second aspect, in a possible implementation of the second aspect, bandwidth of the first radio link is greater than bandwidth of the second radio link.

According to a third aspect, a first communications apparatus is provided. The communications apparatus is, for example, the first communications apparatus described above, for example, the network device. The communications apparatus has functions of implementing the terminal device in the method designs. The functions may be implemented by hardware, or may be implemented by hardware executing corresponding software. The hardware or the software includes one or more units corresponding to the foregoing functions.

In a possible design, a specific structure of the communications apparatus may include a processing unit and a transceiver unit. The processing unit and the transceiver unit may perform corresponding functions in the method provided in any one of the first aspect or the possible implementations of the first aspect.

According to a fourth aspect, a second communications apparatus is provided. The communications apparatus is, for example, the second communications apparatus described above, for example, the terminal device. The communications apparatus has functions of implementing the network device in the method designs. The functions may be implemented by hardware, or may be implemented by hardware executing corresponding software. The hardware or the software includes one or more units corresponding to the foregoing functions.

In a possible design, a specific structure of the communications apparatus may include a processing unit and a transceiver unit. The processing unit and the transceiver unit may perform corresponding functions in the method provided in any one of the second aspect or the possible implementations of the second aspect.

According to a fifth aspect, a third communications apparatus is provided. The communications apparatus is, for example, the first communications apparatus described above, for example, the network device. The communications apparatus has functions of implementing the terminal device in the method designs. The functions may be implemented by hardware, or may be implemented by hardware executing corresponding software. The hardware or the software includes one or more units corresponding to the foregoing functions.

In a possible design, a specific structure of the communications apparatus may include a processor and a transceiver. The processor and the transceiver may perform corresponding functions in the method provided in any one of the first aspect or the possible implementations of the first aspect. The transceiver is implemented as, for example, a communications interface. The communications interface herein may be understood as a radio frequency transceiver component in the terminal device.

According to a sixth aspect, a fourth communications apparatus is provided. The communications apparatus is, for example, the second communications apparatus described above, for example, the terminal device. The communications apparatus has functions of implementing the network device in the method designs. The functions may be implemented by hardware, or may be implemented by hardware executing corresponding software. The hardware or the software includes one or more units corresponding to the foregoing functions.

In a possible design, a specific structure of the communications apparatus may include a processor and a transceiver. The processor and the transceiver may perform corresponding functions in the method provided in any one of the second aspect or the possible implementations of the second aspect. The transceiver is implemented as, for example, a communications interface. The communications interface herein may be understood as a radio frequency transceiver component in the network device.

According to a seventh aspect, a fifth communications apparatus is provided. The communications apparatus may be the first communications apparatus in the foregoing method designs, for example, a terminal device or a chip disposed in the terminal device. The communications apparatus includes: a memory, configured to store computer-executable program code; and a processor, where the processor is coupled to the memory. The program code stored in the memory includes an instruction, and when the processor executes the instruction, the fifth communications apparatus is enabled to perform the method in any one of the first aspect or the possible implementations of the first aspect.

The fifth communications apparatus may further include a communications interface. If the fifth communications apparatus is the terminal device, the communications interface may be a transceiver in the terminal device, for example, a radio frequency transceiver component in the terminal device. Alternatively, if the fifth communications apparatus is the chip disposed in the terminal device, the communications interface may be an input/output interface of the chip, for example, an input/output pin.

According to an eighth aspect, a sixth communications apparatus is provided. The communications apparatus may be the second communications apparatus in the foregoing method designs, for example, a network device or a chip disposed in the network device. The communications apparatus includes: a memory, configured to store computer-executable program code; and a processor, where the processor is coupled to the memory. The program code stored in the memory includes an instruction, and when the processor executes the instruction, the sixth communications apparatus is enabled to perform the method in any one of the second aspect or the possible implementations of the second aspect.

The sixth communications apparatus may further include a communications interface. If the sixth communications apparatus is the network device, the communications interface may be a transceiver in the network device, for example, a radio frequency transceiver component in the network device. Alternatively, if the sixth communications apparatus is the chip disposed in the network device, the communications interface may be an input/output interface of the chip, for example, an input/output pin.

According to a ninth aspect, a first communications system is provided. The communications system may include the first communications apparatus according to the third aspect, the third communications apparatus according to the fifth aspect, or the fifth communications apparatus according to the seventh aspect, and include the second communications apparatus according to the fourth aspect, the fourth communications apparatus according to the sixth aspect, or the sixth communications apparatus according to the eighth aspect.

According to a tenth aspect, a computer storage medium is provided. The computer-readable storage medium stores an instruction, and when the instruction is run on a computer, the computer is enabled to perform the method according to any one of the first aspect or the possible designs of the first aspect.

According to an eleventh aspect, a computer storage medium is provided. The computer-readable storage medium stores an instruction, and when the instruction is run on a computer, the computer is enabled to perform the method according to any one of the second aspect or the possible designs of the second aspect.

According to a twelfth aspect, a computer program product including an instruction is provided. The computer program product stores the instruction, and when the instruction is run on a computer, the computer is enabled to perform the method according to any one of the first aspect or the possible designs of the first aspect.

According to a thirteenth aspect, a computer program product including an instruction is provided. The computer program product stores the instruction, and when the instruction is run on a computer, the computer is enabled to perform the method according to any one of the second aspect or the possible designs of the second aspect.

In the embodiments of this application, the RRC reestablishment does not need to be performed on the first radio link. This reduces an unnecessary RRC reestablishment process, and the terminal device does not need to fall back to the RRC idle state, so that the terminal device can continue to work normally.

DESCRIPTION OF EMBODIMENTS

Figure 1:
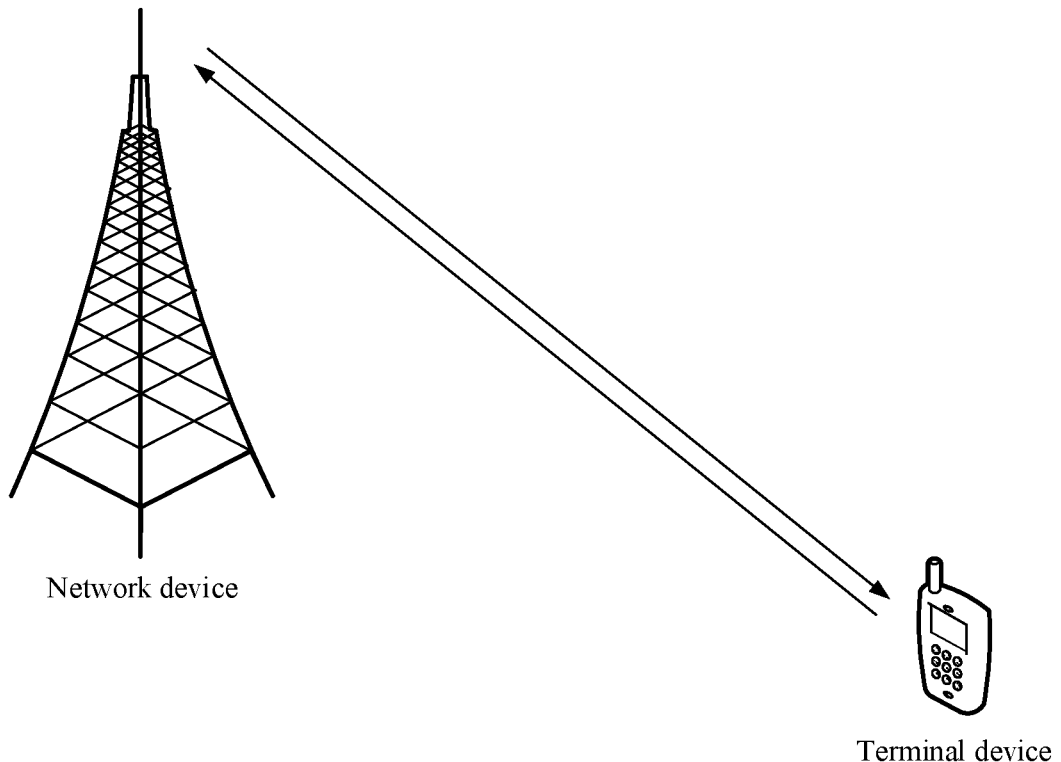
FIG. 1 is a schematic diagram of an application scenario according to an embodiment of this application.

To make the objectives, technical solutions, and advantages of embodiments of this application clearer, the following further describes the embodiments of this application in detail with reference to the accompanying drawings.

The following describes some terms in the embodiments of this application, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a subscriber unit, a subscriber station, a mobile station, a mobile station (mobile), a remote station, an access point (AP), a remote terminal device (remote terminal), an access terminal device (access terminal), a user terminal device (user terminal), a user agent, a user device, or the like. For example, the terminal device may include a mobile phone (which is also referred to as a "cellular" phone), a computer having a mobile terminal device, a portable, pocket-sized, handheld, computer built-in, or vehicle-mounted mobile apparatus, and a smart wearable device. For example, the terminal device may be a device such as a personal communication service (PCS) phone, a cordless telephone set, a session initiation protocol (session initiation protocol, SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode, radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, and is a general term for wearable devices, such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

In addition, the terminal device may further include a relay. It may be understood that all devices that can perform data communication with the base station may be considered as terminal devices.

(2) A network device includes an access network (AN) device such as a base station (for example, an access point), and may be a device that is in an access network and that communicates with a wireless terminal device over an air interface through one or more cells. The network device may be configured to: mutually convert a received over-the-air frame and an internet protocol (IP) packet, and serve as a router between the terminal device and a remaining portion of the access network, where the remaining portion of the access network may include an IP network. The network device may further coordinate attribute management of the air interface. For example, the network device may include an evolved NodeB (eNB or e-NodeB, evolutional NodeB) in a long term evolution (LTE) system or an LTE-advanced (LTE-Advanced, LTE-A) system, may include a next generation NodeB (next generation NodeB, gNB) in a 5G new radio (NR) system, or may include a centralized unit (CU) and a distributed unit (DU) in a cloud access network (cloud radio access network, CloudRAN) system. This is not limited in the embodiments of this application.

(3) In the embodiments of this application, a mentioned cell may be a cell corresponding to a base station, and the cell may belong to a macro base station, or may belong to a base station corresponding to a small cell. The small cell herein may include: a metro cell, a micro cell, a pico cell, a femto cell, and the like. These small cells have characteristics of small coverage and low transmit power, and are applicable to providing a high-speed data transmission service.

On a carrier in an LTE system or an NR system, a plurality of cells may work at a same frequency at the same time. In some special scenarios, it may be considered that a concept of the carrier is equivalent to a concept of the cell. For example, in a carrier aggregation (CA) scenario, when a secondary carrier is configured for the terminal device, configuration information sent by the base station carries both a carrier index of the secondary carrier and a cell identity (Cell ID) of a secondary cell working on the secondary carrier. In this case, it may be considered that a concept of the carrier is equivalent to a concept of the cell. For example, two descriptions that the terminal device accesses a carrier and the terminal device accesses a cell are the same. There are similar descriptions in a dual connectivity (DC) scenario. In the embodiments of this application, the concept of the cell is used for description. In addition, in an NR system, if there is only one activated bandwidth part (BWP) in a cell or on a carrier, it may also be considered that the concept of the cell is equivalent to that of the BWP.

(4) Coverage enhancement (CE) capability: Compared with a terminal device having no CE capability, a terminal device having a CE capability may work at a lower signal-noise ratio (SNR) or a lower signal to interference plus noise ratio (SINR) during communication with an access network device. In other words, compared with a terminal device having no CE capability, a terminal device having a CE capability has a larger maximum coupling loss (MCL) between the terminal device and the access network device under a same condition. A technology that can implement a CE capability includes but is not limited to a data duplication mechanism, and coverage may be improved by performing duplicate sending for a plurality of times. It may be understood that, in addition to maintaining data communication with the access network device by using the CE technology, the terminal device having a CE capability may further maintain data communication with the access network device without depending on the CE technology. To be specific, the terminal device having a CE capability also has a non-CE capability, but a terminal device having a non-CE capability does not necessarily have a CE capability.

(5) The terms "system" and "network" may be used interchangeably in the embodiments of this application. "A plurality of" means two or more. In view of this, "a plurality of" in the embodiments of this application may also be understood as "at least two", for example, two, three, or more. "At least one" may be understood as one or more, for example, one, two, or more. For example, including at least one refers to including one, two, or more, and which one, two, or more are included is not limited. For example, if at least one of A, B, and C is included, A, B, C, A and B, A and C, B and C, or A, B, and C may be included. "And/or" describes an association relationship between associated objects and represents that three relationships may exist. For example, A and/or B may represent three cases: There is only A, there are both A and B, and there is only B. In addition, the character "/" generally indicates an "or" relationship between the associated objects unless otherwise specified.

Unless otherwise specified, ordinal numbers such as "first" and "second" mentioned in the embodiments of this application are used to distinguish between a plurality of objects, and are not used to limit a sequence, a time sequence, priorities, or importance of the plurality of objects. First, technical features in the embodiments of this application are described.

A 5th generation mobile communications technology (5G) new radio (NR) is a global 5G standard based on a new air interface design of orthogonal frequency division multiplexing (OFDM), and is also a very important basis of a next-generation cellular mobile technology. Services of the 5G technology are quite diversified, and may be oriented to enhanced mobile broadband (eMBB), ultra-reliable low-latency communication (URLLC), and massive machine-type communication (mMTC).

Diversified NR system services enable an NR system design to meet access requirements of terminal devices having different bandwidth capabilities. For example, an eMBB terminal device may access an NR system by obtaining broadband information of the NR system, and some mMTC terminals may access the NR system by obtaining narrowband information of the NR system due to considerations of such aspects as design costs and low power consumption. For another example, even for a same service type, for example, mMTC, there are different service rate requirements. For example, for use cases such as meter reading, tracking, and on-demand payment, the terminal device does not require much on a data transmission rate, but generally requires deep coverage. Generally, the terminal device may perform access by using a narrowband. In addition, for example, surveillance video backhaul requires much on the data transmission rate, and therefore may be implemented by using a terminal device having a middle-range and high-end capability. Generally, the terminal device may perform access by using a broadband.

In addition, with the diversification of NR system services, capabilities of NR terminal devices are also diversified, and the NR terminal devices can work in different system bandwidth.

In a process in which the terminal device communicates with the access network device, the terminal device needs to monitor quality of a radio link in real time, to determine whether normal data communication can be ensured if a current radio link between the terminal device and the access network device is used, or whether a radio link to the current access network device can be kept in a connected state.

For example, the terminal device may determine, based on a relationship between quality of a downlink between the terminal device and the access network device and a preset threshold, whether a radio link to the access network device fails. Specifically, it is assumed that Qin and Qout are two thresholds used to determine an RLF. When the terminal device detects that an event that downlink quality is lower than Qout occurs for N310 consecutive times, the terminal device starts a first timer (for example, T310). In a timing process of T310, if the terminal device determines that an event that the downlink quality is higher than Qin occurs for N311 consecutive times, the terminal device stops timing of T310, and determines that the RLF event is not detected. Otherwise, if the event that the downlink quality is higher than Qin does not occur for N311 consecutive times until the timer T310 reaches a specified timing time, the terminal device determines that the RLF event is detected. If the terminal device detects the RLF event, it indicates that quality of a link between the terminal device and an access network device to which the terminal device currently establishes a connection is poor. The terminal device may perform RRC reestablishment with the access network device, or the terminal device reselects a cell and performs RRC reestablishment with the selected cell. If the RRC reestablishment fails, the terminal device falls back to an RRC idle state. It can be learned that when the RLF event is detected, the terminal device needs to restart the RRC reestablishment, or even fall back to the RRC idle state.

A future terminal device may have a plurality of bandwidth capabilities. Even if a radio link fails, the terminal device may continue to work on another radio link that another bandwidth capability supports. However, in an existing manner, if a radio link fails, the terminal device performs RRC reestablishment, resulting in an unnecessary RRC reestablishment process. Moreover, the terminal device may fall back to the RRC idle state, and consequently, the terminal device may not work normally.

In view of this, the technical solutions in the embodiments of this application are provided. If it is determined, in a first detection process, that a first radio link fails, a second detection process may be further started to detect a second radio link. If the second radio link does not fail, the second radio link may continue to be used in communication with the access network device, and RRC reestablishment does not need to be performed on the first radio link. This reduces an unnecessary RRC reestablishment process, and the terminal device does not need to fall back to the RRC idle state, so that the terminal device can continue to work normally.

The technical solutions provided in the embodiments of this application may be used in the 5G system, or may be used in the LTE system, or may be used in a next-generation mobile communications system or another similar communications system. This is not specifically limited.

The following describes a network architecture to which the embodiments of this application is applied. Refer to FIG. 1.

FIG. 1 includes an access network device and a terminal device, and the terminal device is connected to the access network device. Certainly, a quantity of terminal devices in FIG. 1 is merely an example. In actual application, one access network device may provide services for a plurality of terminal devices, and each of all or some terminal devices in the plurality of terminal devices may detect a link by using the technical solutions provided in the embodiments of this application.

The access network device in FIG. 1 is, for example, a base station. The access network device corresponds to different devices in different systems. For example, the access network device may correspond to an eNB in a 4th generation mobile communications technology (4G) system, and correspond to a 5G access network device, for example, a gNB, in a 5G system.

The following describes the technical solutions provided in the embodiments of this application with reference to the accompanying drawings.

First, an RLF mechanism in the embodiments of this application is described.

Figure 2:
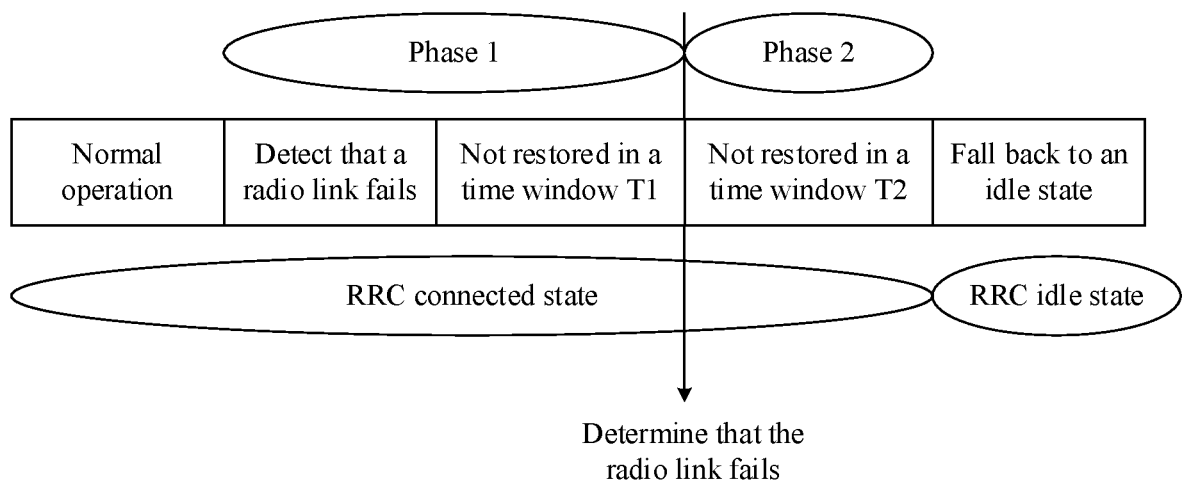
FIG. 2 is a schematic diagram of an RLF mechanism.

FIG. 2 is a schematic diagram of the RLF mechanism. Normal operation indicates that a terminal device and an access network device maintain normal data communication. In a normal operation process, the terminal device detects quality of a downlink between the terminal device and the access network device, and determines, according to a preset rule, whether a radio link failure is detected.

For example, it is assumed that Qin and Qout are two thresholds used to determine an RLF. When the terminal device detects that an event that downlink quality is lower than Qout occurs for N310 consecutive times, the terminal device determines that a radio link failure is detected. In this case, the terminal device determines, in a preset time window T1 according to the preset rule, whether a radio link can be restored. For example, the terminal device starts a timer (for example, T310), and timing duration of T310 is, for example, T1. In other words, a timing time period of T310 is a length of the time window T1 in FIG. 2. In a timing process of T310, if the terminal device determines that an event that the downlink quality is higher than Qin occurs for N311 consecutive times, the terminal device stops timing of T310, and determines that the RLF event is not detected, that is, the radio link may be restored. Otherwise, if the event that the downlink quality is higher than Qin does not occur for N311 consecutive times until the time window T1 ends, the terminal device determines that the radio link is not restored in the time window T1, that is, the terminal device determines that the RLF event is detected. If determining that the RLF event is detected, the terminal device enters a phase 2 shown in FIG. 2 for operation. In a time window T2, the terminal device may determine, by using an RRC reestablishment process, whether the terminal device can restore the radio link with the access network device. If the terminal device does not restore the radio link between the terminal device and the access network device in T2, the terminal device may fall back to an RRC idle state, and search for a cell again.

Figure 3A:
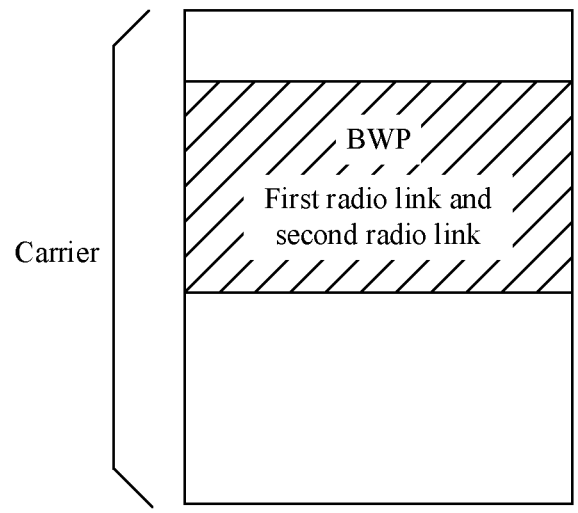
FIG. 3A is a schematic diagram of a frequency domain resource of a first radio link and a frequency domain resource of a second radio link.
Figure 3B:
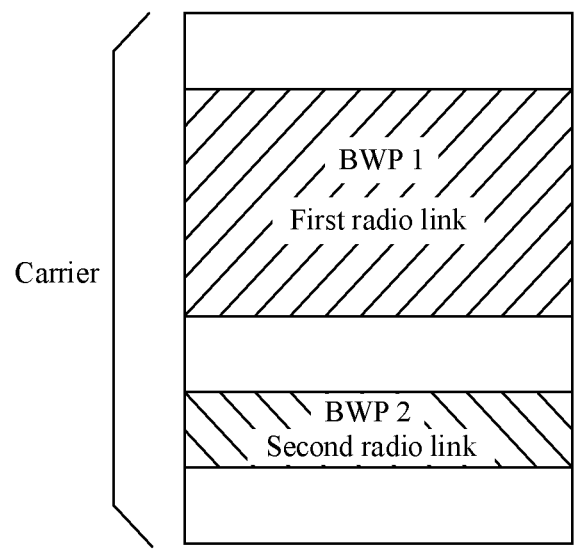
FIG. 3B is another schematic diagram of a frequency domain resource of a first radio link and a frequency domain resource of a second radio link.

In the embodiment of this application, both the first radio link and the second radio link are links between the terminal device and the access network device, and the first radio link and the second radio link may be different radio links. For example, that bandwidth of the first radio link is greater than bandwidth of the second radio link may be understood as: the first radio link is a wideband link and the second radio link is a narrowband link; or the first radio link is a radio link corresponding to a URLLC service, and the second radio link is a radio link corresponding to an eMBB service. The first radio link and the second radio link are not limited in the embodiments of this application. A frequency domain resource corresponding to the first radio link may be the same as or different from a frequency domain resource corresponding to the second radio link. In one manner, as shown in FIG. 3A, the frequency domain resource corresponding to the first radio link includes the frequency domain resource corresponding to the second radio link. Bandwidth of the two frequency domain resources may be the same or may be different, and the two radio links may be located in one bandwidth part (BWP). In another manner, frequency domain resources corresponding to the first radio link and the second radio link may be frequency division multiplexed (FDM). As shown in FIG. 3B, the two radio links are located in different BWPs.

Figure 4:
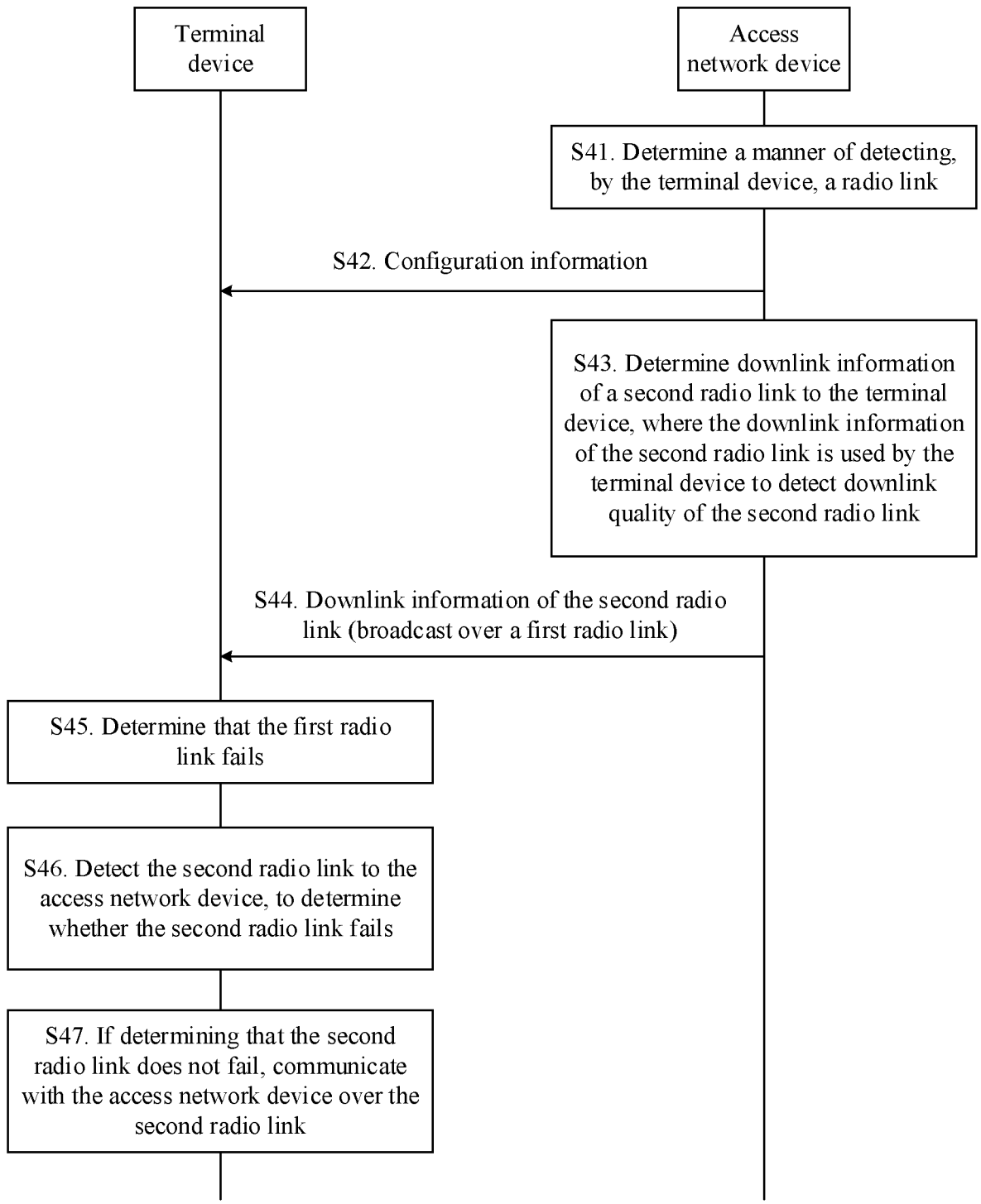
FIG. 4 is a flowchart of a link detection method according to an embodiment of this application.

An embodiment of this application provides a link detection method. FIG. 4 is a flowchart of the method. In the following description process, an example in which the method is applied to the network architecture shown in FIG. 1 is used. In addition, the method may be performed by two communications apparatuses. The two communications apparatuses are, for example, a first communications apparatus and a second communications apparatus. The first communications apparatus may be a network device or a communications apparatus that can support a network device in implementing functions required in the method, or the first communications apparatus may be a terminal device or a communications apparatus that can support a terminal device in implementing functions required in the method. Certainly, the first communications apparatus may alternatively be another communications apparatus, for example, a chip system. It is the same case for the second communications apparatus. The second communications apparatus may be a network device or a communications apparatus that can support a network device in implementing functions required in the method, or the second communications apparatus may be a terminal device or a communications apparatus that can support a terminal device in implementing functions required in the method. Certainly, the second communications apparatus may alternatively be another communications apparatus, for example, a chip system. In addition, implementations of the first communications apparatus and the second communications apparatus are not limited. For example, the first communications apparatus may be a network device, and the second communications apparatus is a terminal device; or both the first communications apparatus and the second communications apparatus are network devices; or both the first communications apparatus and the second communications apparatus are terminal devices; or the first communications apparatus is a network device, and the second communications apparatus is a communications apparatus that can support a terminal device in implementing functions required in the method. For example, the network device is a base station.

For ease of description, the following uses an example in which the method is performed by an access network device and a terminal device, that is, an example in which the first communications apparatus is an access network device and the second communications apparatus is a terminal device. In this embodiment, the network architecture shown in FIG. 1 is used as an example. Therefore, the access network device described below may be the access network device in the network architecture shown in FIG. 1, and the terminal device described below may be the terminal device in the network architecture shown in FIG. 1.

S41. The access network device determines a manner of detecting, by the terminal device, a radio link.

In this embodiment of this application, the manner of detecting, by the terminal device, a radio link may include at least one of the following:

Manner 1: The terminal device automatically detects a first radio link between the terminal device and the access network device, and detects only the first radio link, but does not detect a second radio link between the terminal device and the access network device.

Manner 2: The terminal device detects a second radio link between the terminal device and the access network device after triggering the access network device. For details about the triggering, refer to the following descriptions.

Manner 3: The terminal device automatically detects a first radio link and a second radio link between the terminal device and the access network device.

For example, for a terminal device having no CE capability, the manner 1 described above may be used, that is, only the first radio link is detected, and the second radio link is not detected. For a terminal device having a CE capability, the manner 1, the manner 2, or the manner 3 described above may be used. If the manner 1 described above is used, it indicates that even the terminal device having a CE capability may detect only the first radio link. This is because if the terminal device further needs to detect the second radio link, the access network device may need to preconfigure a resource for the terminal device to report, to the access network device, information associated with the second radio link. For example, the terminal device performs data transmission with the access network device over the second radio link. When the access network device cannot preconfigure the resource, the access network device may determine that the manner of detecting, by the terminal device, a radio link is the manner 1. In this way, resource utilization efficiency of the access network device can be ensured. If the manner 2 described above is used, that the terminal device detects the second radio link after triggering the access network device may be understood as: the terminal device may autonomously determine whether to detect the second radio link, so that detection on the second radio link better meets a requirement of the terminal device. For example, after triggering the access network device, the terminal device may detect the second radio link when the first radio link fails. If the first radio link does not fail after the terminal device triggers the access network device, optionally, the terminal device may notify the access network device, so that the access network device releases a preconfigured resource. The preconfigured resource is used by the terminal device to report, to the access network device, the information associated with the second radio link. If the manner 3 described above is used, the terminal device may automatically detect the first radio link and the second radio link. For example, the terminal device may first detect the first radio link, and when determining that the first radio link fails or when determining that the first radio link is about to fail, the terminal device may automatically detect the second radio link, and a network device is not required to additionally indicate the terminal device to perform detection. In this way, an available radio link can be detected in a more timely manner, thereby helping ensure continuity of communication between the terminal device and the access network device as much as possible.

The manner 1 and the manner 3 are relatively easy to understand. The following describes the manner 2.

If the terminal device determines that quality of the first radio link is about to deteriorate, for example, it is determined that the terminal device is about to enter or is entering an area, such as a basement or a tunnel, with relatively poor coverage, the terminal device may trigger the access network device. For example, the terminal device may send a trigger message to the access network device. The trigger message may be used to indicate that the quality of the first radio link over which the terminal device is communicating with the access network device deteriorates. A specific representation form may be, for example, a measurement result. The measurement result may be, for example, reflected by received energy, or may be reflected by a measurement result that can reflect channel quality. For example, the measurement result may be represented by reference signal received power (RSRP), or may be represented by reference signal received quality (RSRQ), or may be represented by a channel state indicator (CSI). Further, the trigger message may be a specific value of the measurement result, for example, a value of the measured RSRP, RSRQ, or CSI. The trigger message may alternatively be a comparison result between the measurement result and a threshold, and the comparison result may be used to indicate whether the first radio link deteriorates. The trigger message may alternatively be a percentage of the comparison result between the measurement result and a threshold in a specific time range. For example, it is assumed that the measurement result is represented by the RSRP and the specific time range is represented by TO, and it is assumed that the terminal device determines M RSRP results in TO. The M results are separately compared with a threshold, so that if RSRP results greater than (or equal to) the threshold account for X % of the M RSRP results, it may be determined that RSRP results less than or equal to (or less than) the threshold account for 1—X % of the M RSRP results. Alternatively, there may be another specific representation form used to indicate that the quality of the first radio link over which the terminal device is communicating with the access network device deteriorates. This is not specifically limited. In addition, the trigger message may be further used to request the access network device to detect the second radio link, or may be used to indicate another event. It should be noted that, regardless of specific indication content of the trigger message or information specifically carried in the trigger message, in this embodiment of this application, a message used to indicate that current quality of the first radio link deteriorates may be considered as the trigger message.

After receiving the trigger message, the access network device may indicate the terminal device to detect the second radio link between the terminal device and the access network device. After receiving an indication from the access network device, the terminal device may detect the second radio link, or after determining that the first radio link really fails, the terminal device starts to detect the second radio link. For example, if the terminal device determines that continuous duration for which the quality of the first radio link deteriorates does not exceed a threshold, it may be considered that the first radio link does not really fails. In this case, the terminal device may communicate with the access network device still over the first radio link. Further optionally, the terminal device may notify the access network device of a working state of the first radio link. This can avoid an impact of a false failure alarm of the first radio link on resource utilization efficiency. Generally, resource utilization efficiency of the first radio link for data transmission between the terminal device and the access network device is higher than resource utilization efficiency of the second radio link for data transmission between the terminal device and the access network device. For example, in a coverage enhancement scenario, the second radio link may achieve a larger MCL usually by using a data duplication mechanism. Therefore, the resource utilization efficiency of the first radio link is higher than the resource utilization efficiency of the second radio link. Therefore, if the terminal device may start to detect the second radio link after determining that the first radio link really fails, the resource utilization efficiency can be improved. Alternatively, after receiving the trigger message, the access network device may send downlink information of the second radio link to the terminal device without sending a dedicated indication to the terminal device. After receiving the downlink information of the second radio link, the terminal device may detect the second radio link based on the downlink information of the second radio link, or after determining that the first radio link really fails, the terminal device detects the second radio link based on the downlink information of the second radio link. This can also avoid an impact of a false failure alarm of the first radio link on resource utilization efficiency. A resource for the terminal device to send the trigger message may be configured by the access network device for the terminal device.

It may be understood that, in a first case of the manner 2, whether the terminal device detects the first radio link may not be limited. For example, before the terminal device triggers the access network device, the terminal device may have not detected the first radio link, or the terminal device may have detected the first radio link; or when the terminal device triggers the access network device, the terminal device may have completed detection on the first radio link, and confirm that the first radio link does not fail, or the terminal device may have not completed detection on the first radio link. In conclusion, after the terminal device receives the indication from the access network device, or after the terminal device receives the downlink information of the second radio link from the access network device, the terminal device may directly detect the second radio link.

Alternatively, in a second case of the manner 2, the terminal device also needs to detect the first radio link. In this case, the manner 2 may also be understood as follows: The terminal device detects the first radio link between the terminal device and the access network device, and after the terminal device triggers the access network device and determines that the first radio link fails, the terminal device detects the second radio link between the terminal device and the access network device. For example, the terminal device first detects the first radio link. If determining that quality of the first radio link is about to deteriorate, for example, determining that the terminal device is about to enter or is entering an area, such as a basement, with relatively poor coverage, the terminal device may trigger the access network device. For example, the terminal device may send a trigger message to the access network device. After receiving the trigger message, the access network device may indicate the terminal device to detect the second radio link between the terminal device and the access network device. Alternatively, after receiving the trigger message, the access network device may send the downlink information of the second radio link to the terminal device without sending a dedicated indication to the terminal device. In this case, after the terminal device receives the indication from the access network device, or after the terminal device receives the downlink information of the second radio link from the access network device, if detection on the first radio link is not completed, the terminal device continues to detect the first radio link until the detection on the first radio link is completed. If determining that the first radio link fails, the terminal device starts to detect the second radio link. If determining that the first radio link does not fail, the terminal device does not need to detect the second radio link. Alternatively, after the terminal device receives the indication from the access network device, or after the terminal device receives the downlink information of the second radio link from the access network device, if detection on the first radio link is completed, and if determining that the first radio link fails, the terminal device starts to detect the second radio link. If determining that the first radio link does not fail, the terminal device does not need to detect the second radio link.

Alternatively, in addition to the foregoing three manners, the terminal device may detect the radio link in another manner. This is not limited in this embodiment of this application.

For example, the access network device may determine, based on capability information of the terminal device, the manner of detecting, by the terminal device, a radio link. In this case, the terminal device may send the capability information of the terminal device to the access network device in advance. For example, the capability information of the terminal device may be used to indicate whether the terminal device has a capability of detecting the first radio link and/or a capability of detecting the second radio link. In other words, the capability information of the terminal device may be used to indicate whether the terminal device has a capability of detecting the first radio link or a capability of detecting the second radio link, or used to indicate whether the terminal device has a capability of detecting the first radio link and a capability of detecting the second radio link. The capability of detecting the first radio link may be considered as a default capability of the terminal device. In this case, the terminal device only needs to indicate, by using the capability information of the terminal device, whether the terminal device has the capability of detecting the second radio link, and does not need to indicate, by using the capability information of the terminal device, whether the terminal device has the capability of detecting the first radio link. For example, in this case, if the capability information of the terminal device indicates that the terminal device has the capability of detecting the second radio link, it indicates that the terminal device has the capability of detecting the first radio link and the second radio link; or if the capability information of the terminal device indicates that the terminal device does not have the capability of detecting the second radio link, it indicates that the terminal device has the capability of detecting the first radio link, but does not have the capability of detecting the second radio link. Alternatively, the capability of detecting the first radio link may not be a default capability of the terminal device. In this case, the terminal device may also indicate, to the network device, whether the terminal device has the capability of detecting the first radio link. For example, the terminal device may indicate, to the network device, whether the terminal device has the capability of detecting the first radio link and/or the capability of detecting the second radio link. Alternatively, although the capability of detecting the first radio link is a default capability of the terminal device, the terminal device may indicate, to the network device still by using the capability information of the terminal device, that the terminal device has the capability of detecting the first radio link. For example, the terminal device may indicate, to the network device, whether the terminal device has the capability of detecting the first radio link and/or the capability of detecting the second radio link.

Alternatively, if a process in which the terminal device detects the first radio link is considered as a first detection process, and a process in which the terminal device detects the second radio link is considered as a second detection process, it may also be understood as: the capability information of the terminal device may be used to indicate whether the terminal device has a capability of performing the first detection process, and/or whether the terminal device has a capability of performing the second detection process. In other words, the capability information of the terminal device may be used to indicate whether the terminal device has a capability of performing the first detection process, or indicate whether the terminal device has a capability of performing the second detection process, or indicate whether the terminal device has a capability of performing the first detection process and whether the terminal device has a capability of performing the second detection process.

Alternatively, the access network device may determine, based on another factor, the manner of detecting, by the terminal device, a radio link. This is not specifically limited.

S42. The access network device sends configuration information to the terminal device, and the terminal device receives the configuration information from the access network device, where the configuration information is used to indicate the manner of detecting a radio link. After determining the manner of detecting, by the terminal device, a radio link, the access network device may send the configuration information to the terminal device, to indicate the manner of detecting a radio link, so that the terminal device can detect a radio link based on the manner of detecting a radio link indicated by the configuration information.

An advantage of configuring, by the access network device, the manner of detecting a radio link for the terminal device is that the access network device may determine, based on current resource utilization efficiency, whether to enable the terminal device to detect the second radio link. For example, the terminal device may ensure a connection between the terminal device and the access network device by detecting the second radio link, but the access network device may need to reserve, for the terminal device, an uplink resource used after the terminal device is switched to the second radio link. Therefore, resource utilization efficiency can be ensured by the access network device through enabling.

S41 and S42 are optional steps, and are not mandatory.

S43. The access network device determines the downlink information of the second radio link between the access network device and the terminal device, where the downlink information of the second radio link is used by the terminal device to detect downlink quality of the second radio link.

To detect the second radio link, that is, to implement a second radio link quality assessment mechanism, the terminal device needs to obtain the downlink information of the second radio link. For example, the downlink information of the second radio link includes at least one of a reference signal corresponding to the second radio link or a downlink control channel corresponding to the second radio link. Certainly, other information may also be included. For example, the terminal device may obtain the downlink information of the second radio link from the access network device, or the downlink information of the second radio link may be configured. In this embodiment, an example in which the terminal device obtains the downlink information of the second radio link from the access network device is used. Therefore, the access network device needs to determine the downlink information of the second radio link.

That the access network device determines the downlink information of the second radio link between the access network device and the terminal device may include: the access network device generates the downlink information of the second radio link between the access network device and the terminal device. For example, when the downlink information of the second radio link is the reference signal corresponding to the second radio link, the access network device may first generate the reference signal, and then send the reference signal to the terminal device. The reference signal may be specific to the terminal device, or may be valid for a plurality of terminal devices. Alternatively, because the access network device performs data communication with the terminal device over the first radio link, when the terminal device needs to assess quality of the second radio link, the access network device needs to notify the terminal device of the downlink information corresponding to the second radio link. Before the notification, the access network device needs to determine a specific form of the downlink information to be sent to the terminal device. Therefore, that the access network device determines the downlink information of the second radio link between the access network device and the terminal device may further include: the access network device determines a specific form of the downlink information to be sent to the terminal device. That the access network device determines the downlink information of the second radio link between the access network device and the terminal device may further include another implementation form. This is not specifically limited.

S44. The access network device broadcasts the downlink information of the second radio link to the terminal device over the first radio link between the access network device and the terminal device.

If the access network device notifies the terminal device of the downlink information of the second radio link, for example, the access network device may broadcast the downlink information of the second radio link over the first radio link. The access network device may broadcast the downlink information of the second radio link over the first radio link. For example, the access network device notifies the terminal device of the downlink information of the second radio link over a broadcast channel corresponding to the first radio link. After the terminal device receives the downlink information that is of the second radio link and that is broadcast by the access network device over the first radio link, the terminal device may detect the second radio link by using the downlink information of the second radio link.

In this embodiment of this application, the broadcast channel corresponding to the first radio link may include a channel carrying a master information block (MIB), and may further include a channel carrying system information (SI). For example, the broadcast channel may be a physical broadcast channel (PBCH), or a physical downlink control channel (PDCCH) scrambled by using a radio network temporary identifier (RNTI) dedicated to the system information. The RNTI dedicated to the system information may be, for example, an SI-RNTI. More generally, the broadcast channel corresponding to the first radio link may further include a channel carrying information about at least two terminal devices.

An advantage of broadcasting, by the access network device, the downlink information of the second radio link over the first radio link is that when terminal device determines that the first radio link fails, because the terminal device has already obtained the downlink information of the second radio link in a broadcast manner, the terminal device may not need to send a request message to the access network device to obtain the downlink information of the second radio link. This helps save transmission resources. In addition, because the first radio link has failed in this case, even if the terminal device can send the request message to the access network device, the access network device may fail to send the downlink information of the second radio link to the terminal device over the failed first radio link. Therefore, the access network device broadcasts the downlink information of the second radio link over the first radio link, so that it can be ensured that if losing the first radio link to the access network device, the terminal device can also detect the downlink quality of the second radio link based on the downlink information of the second radio link that is obtained in advance, thereby avoiding an unnecessary RRC reestablishment process or a procedure in which the terminal device enters an RRC idle state.

S45. The terminal device determines that the first radio link between the terminal device and the access network device fails. It may be understood that the terminal device determines, in the first detection process, that the first radio link between the terminal device and the access network device fails.

S43 and S44 may be performed before the terminal device determines that the first radio link fails, for example, may be performed before the terminal device detects the first radio link, or may be performed at a moment at which the terminal device starts to detect the first radio link, or may be performed in a process in which the terminal device detects the first radio link. This is not specifically limited.

The terminal device may periodically detect the first radio link, that is, periodically perform the first detection process, or may detect the first radio link after receiving a trigger from the access network device, that is, perform the first detection process after receiving a trigger from the access network device. This is not specifically limited. If S42 is performed, this embodiment uses an example in which the manner of detecting a radio link indicated by the configuration information in S42 includes the first detection process. For example, if the manner of detecting a radio link indicated by the configuration information is the manner 1, the manner 3, or the second case of the manner 2, the first detection process is naturally included. If the manner of detecting a radio link indicated by the configuration information is the first case of the manner 2, this embodiment uses an example in which the terminal device performs the first detection process.

In the manner 1 in which the terminal device determines that the first radio link between the terminal device and the access network device fails, in the first detection process, if the terminal device determines that an event that downlink quality of the first radio link is less than a first threshold is detected for N1 or more than N1 times, the terminal device determines that the first radio link fails. The first threshold is, for example, Qout, or may be another value. N1 is a positive integer. For example, N1 is equal to N310, or may be another value.

In an example, if the event, detected by the terminal device, that the downlink quality of the first radio link is less than the first threshold occurs for N1 or more than N1 consecutive times, it may be determined that the first radio link fails.

In another example, if an event, detected by the terminal device in timing duration of a first timer, that the downlink quality of the first radio link is less than the first threshold occurs for N1 or more than N1 times, it may be determined that the first radio link fails.

For example, when detecting, for the first time, the event that the downlink quality of the first radio link is less than the first threshold, the terminal device starts a timer, which is, for example, referred to as the first timer. The timing duration of the first timer forms a time window, for example, a time window T3. In the time window T3, if detecting that the event that the downlink quality of the first radio link is less than the first threshold occurs for N1 or more than N1 times, the terminal device determines that the first radio link fails. In such an example, the event that the downlink quality of the first radio link is less than the first threshold may be consecutively detected, or may not be consecutively detected. This detection manner is strict to link detection and can ensure effective data transmission. Optionally, in this manner, assuming that the terminal device detects, at a moment t1 and a moment t2, that the downlink quality of the first radio link is less than the first threshold, where the moment t2 is after the moment t1, the terminal device may use the moment t1 as a start location of the time window T3, and continue to assess whether an event meeting a first radio link failure occurs in the time window T3. In addition, the terminal device may alternatively use the moment t2 as a start location of the time window T3, and continue to assess whether an event meeting a first radio link failure occurs in the time window T3. In other words, the start moment of the time window T3 is variable, even if a time interval between the moment t1 and the moment t2 is less than the timing duration corresponding to the time window T3.

In the manner 2 in which the terminal device determines that the first radio link between the terminal device and the access network device fails, in the first detection process, if a proportion of a quantity of events, detected by the terminal device in timing duration of a first timer, that downlink quality of the first radio link is less than a first threshold in a quantity of events that the terminal device assesses the downlink quality of the first radio link in the timing duration of the first timer is greater than a first proportion threshold, it may be determined that the first radio link fails. Alternatively, it may be understood as that, if a proportion of a quantity of events, detected by the terminal device in timing duration of a first timer, that downlink quality of the first radio link is less than a first threshold in a quantity of events that the terminal device detects the downlink quality of the first radio link in the timing duration of the first timer is greater than a first proportion threshold, it may be determined that the first radio link fails. The event that the terminal device assesses the downlink quality of the first radio link in the timing duration of the first timer may be understood as the event that the terminal device detects the downlink quality of the first radio link in the timing duration of the first timer.

In the manner 3 in which the terminal device determines that the first radio link between the terminal device and the access network device fails, in the first detection process, if the terminal device determines that an event that downlink quality of the first radio link is less than a first threshold is detected for N1 or more than N1 times, and determines that an event that the downlink quality of the first radio link is greater than a second threshold is detected for less than M1 times, the terminal device determines that the first radio link fails, where the second threshold is greater than or equal to the first threshold. M1 is a positive integer.

In an example, if the terminal device determines that the event that the downlink quality of the first radio link is less than the first threshold is detected for N1 or more than N1 consecutive times, and determines that the event that the downlink quality of the first radio link is greater than the second threshold is detected for less than M1 consecutive times, the terminal device determines that the first radio link fails, where the second threshold is greater than or equal to the first threshold. M1 is a positive integer.

For example, if the terminal device detects that the event that the downlink quality is less than the first threshold occurs for N1 or more than N1 consecutive times, the terminal device determines that a radio link failure is detected. After the terminal device determines that the first radio link fails, the terminal device may start a second timer. It may be understood that a time range between a start moment and an end moment of the second timer forms a time window, for example, a time window T4. In the time window T4, the terminal device continues to detect the downlink quality of the first radio link between the terminal device and the access network device, and compares the detected downlink quality with the second threshold. If detecting once that the downlink quality is greater than the second threshold, the terminal device may determine that radio link synchronization (in-sync) occurs once. For ease of description, in this specification, a process in which the terminal device detects the downlink quality of the first radio link in the time window T4, and compares the detected downlink quality with the second threshold is referred to as a process in which the terminal device determines radio link synchronization. It should be noted that, the terminal device may alternatively determine the downlink quality of the first radio link based on the downlink information, of the first radio link, sent by the access network device. This is similar to the manner of determining a radio link failure. Downlink information used in the process in which the terminal device determines the radio link synchronization may be the same as or different from downlink information used in the process in which the terminal device determines the radio link failure. This is not specifically limited. In the time window T4, if the terminal device determines that the radio link synchronization occurs for M1 or more than M1 consecutive times, that is, in the time window T4, if the terminal device determines that the event that the downlink quality of the first radio link is greater than the second threshold occurs for M1 or more than M1 consecutive times, it may be determined that the first radio link is restored. Otherwise, in the time window T4, if the terminal device determines that the event that the downlink quality of the first radio link is greater than the second threshold occurs for less than M1 consecutive times, the terminal device determines that the first radio link fails, and the first radio link is not restored in the time window T4.

In another example, if the terminal device determines that an event, detected in timing duration of a third timer, that the downlink quality of the first radio link is less than the first threshold occurs for N1 or more than N1 times, and determines that an event, detected in timing duration of a fourth timer, that the downlink quality of the first radio link is greater than the second threshold occurs for less than M1 times, the terminal device determines that the first radio link fails, where the second threshold is greater than or equal to the first threshold. M1 is a positive integer.

For example, when detecting, for the first time, the event that the downlink quality of the first radio link is less than the first threshold, the terminal device starts a timer, which is, for example, referred to as the third timer. The timing duration of the third timer forms a time window, for example, a time window T5. In the time window T5, if it is detected that the event that the downlink quality of the first radio link is less than the first threshold occurs for N1 or more than N1 times, the terminal device determines that the first radio link fails. In this case, the terminal device determines, in a time window T6 according to a preset rule, whether the first radio link can be restored. For example, the terminal device starts a timer, for example, the fourth timer, and the timing duration of the fourth timer forms the time window T6. In a timing process of the fourth timer, if the terminal device determines that the event that the downlink quality is greater than the second threshold occurs for M1 or more than M1 times, the terminal device stops timing of the fourth timer, and determines that the RLF event is not detected, in other words, the first radio link may be restored. Otherwise, if the event that the downlink quality is greater than the second threshold occurs for less than M1 times until the fourth timer expires, the terminal device determines that the first radio link is not restored in the timing duration of the fourth timer, and therefore determines that the first radio link fails. In such an example, the N1 events consecutively occur, and the M1 events consecutively occur; or the N1 events consecutively occur, and the M1 events do not consecutively occur; or the N1 events do not consecutively occur, the M1 events consecutively occur; or the N1 events do not consecutively occur, and the M1 events do not consecutively occur.

A value of N1 may be specified in a protocol, or may be configured by the access network device. A value of M1 may be specified in a protocol, or may be configured by the access network device. The first threshold may be specified in a protocol, or may be configured by the access network device. The second threshold may be specified in a protocol, or may be configured by the access network device. The timing duration of the first timer may be specified in a protocol, or may be configured by the access network device. The first proportion threshold may be specified in a protocol, or may be configured by the access network device. Timing duration of the second timer may be specified in a protocol, or may be configured by the access network device. Further optionally, a manner of performing configuration by the access network device includes a manner of sending a notification by using higher layer signaling, media access control (MAC) signaling, or physical layer signaling, or may be another manner. This is not specifically limited.

In the foregoing examples, the terminal device may determine the downlink quality of the first radio link based on the downlink information, of the first radio link, sent by the access network device. The downlink information of the first radio link herein includes, for example, at least one of a reference signal of the first radio link or a downlink channel of the first radio link. Certainly, other information may be further included. The downlink quality of the first radio link is reflected by, for example, a signal to interference plus noise ratio (SINR). In this case, the first threshold may also correspond to an SINR, so that the first threshold and the SINR may be compared. Certainly, the second threshold may also correspond to an SINR. Generally, a value of the SINR corresponding to the second threshold may be greater than a value of the SINR corresponding to the first threshold, that is, the second threshold is greater than the first threshold. Alternatively, a value of the SINR corresponding to the second threshold may be equal to a value of the SINR corresponding to the first threshold, that is, the second threshold is equal to the first threshold.

Optionally, the downlink quality of the first radio link may alternatively be represented by a bit error ratio (BER) or a block error ratio (BLER).

In the manner 3 described above in which the terminal device determines that the first radio link between the terminal device and the access network device fails, "determining that an event detected, in timing duration of a third timer, that the downlink quality of the first radio link is less than the first threshold occurs for N1 or more than N1 times" may be replaced with the following step: determining that a proportion of a quantity of events, detected in the timing duration of the third timer, that the downlink quality of the first radio link is less than the first threshold in a quantity of events that the terminal device detects the downlink quality of the first radio link in the timing duration of the third timer is greater than or equal to a second proportion threshold. In addition, in the manner 3 in which the terminal device determines that the first radio link between the terminal device and the access network device fails, "determining that an event, detected in timing duration of a fourth timer, that the downlink quality of the first radio link is greater than the second threshold occurs for less than M1 times" may be replaced with the following step: determining that a proportion of a quantity of events, detected in the timing duration of the fourth timer, that the downlink quality of the first radio link is greater than the second threshold in a quantity of events that the downlink quality of the first radio link is detected in the timing duration of the fourth timer is less than a third proportion threshold. The second proportion threshold may be specified in a protocol, or may be configured by the access network device. The third proportion threshold may be specified in a protocol, or may be configured by the access network device. In this case, both of the foregoing two steps may be replaced, or either of the two steps may be replaced. In this way, three other manners in which the terminal device determines that the first radio link between the terminal device and the access network device fails may be obtained.

In other words, a manner 4 in which the terminal device determines that the first radio link between the terminal device and the access network device fails is as follows: In the first detection process, the terminal device determines a proportion of a quantity of events, detected in timing duration of a third timer, that downlink quality of the first radio link is less than a first threshold in a quantity of events that the terminal device detects the downlink quality of the first radio link in the timing duration of the third timer is greater than or equal to a second proportion threshold, and determines that an event that the downlink quality of the first radio link is greater than a second threshold is detected for less than M1 times, the terminal device determines that the first radio link fails.

A manner 5 in which the terminal device determines that the first radio link between the terminal device and the access network device fails is as follows: In the first detection process, if the terminal device determines that an event that downlink quality of the first radio link is less than a first threshold is detected for N1 or more than N1 times, and the terminal device determines that a proportion of a quantity of events, detected in timing duration of a fourth timer, that the downlink quality of the first radio link is greater than a second threshold in a quantity of events that the downlink quality of the first radio link is detected in the timing duration of the fourth timer is less than a third proportion threshold, the terminal device determines that the first radio link fails.

A manner 6 in which the terminal device determines that the first radio link between the terminal device and the access network device fails is as follows: In the first detection process, the terminal device determines that a proportion of a quantity of events, detected in timing duration of a third timer, that downlink quality of the first radio link is less than a first threshold in a quantity of events that the terminal device detects the downlink quality of the first radio link in the timing duration of the third timer is greater than or equal to a second proportion threshold, and determines that a proportion of a quantity of events, detected in timing duration of a fourth timer, that the downlink quality of the first radio link is greater than a second threshold in a quantity of events that the downlink quality of the first radio link is detected in the timing duration of the fourth timer is less than a third proportion threshold, the terminal device determines that the first radio link fails.

It should be noted that, in this embodiment of this application, a first radio link failure is a first radio link failure that is determined by the terminal device based on a first radio link quality assessment mechanism corresponding to the first radio link, or a first radio link failure that is determined by the terminal device based on a first radio link quality assessment mechanism corresponding to the first detection process. The first radio link quality assessment mechanism herein may include an assessment mechanism that is used by the terminal device in an assessment process. For example, the assessment mechanism includes at least one of the following: downlink information used by the terminal device to assess the first radio link (to assess a first radio link failure and/or assess first radio link synchronization), the first threshold, the second threshold, the first proportion threshold, the second proportion threshold, the third proportion threshold, the timing duration of the first timer, the timing duration of the second timer, the timing duration of the third timer, the timing duration of the fourth timer, the value of N1, and the value of M1 that are used by the terminal device, a parameter used by the terminal device to calculate the downlink quality of the first radio link, or the like.

Which one of the foregoing manners is used by the terminal device to determine that the first radio link between the terminal device and the access network device fails may be specified in a protocol, or may be configured by the access network device. This is not specifically limited.

S46. The terminal device detects the second radio link between the terminal device and the access network device, to determine whether the second radio link fails.

After the terminal device determines that the first radio link between the terminal device and the access network device fails, the terminal device may detect the second radio link. For example, the terminal device starts a second detection process to detect the second radio link.

If the manner of detecting, by the terminal device, a radio link indicated by the configuration information is the manner 1, or there is no configuration information, and the manner of detecting, by the terminal device, a radio link is the manner 1, the terminal device detects only the first radio link, and does not perform S46. If the manner of detecting, by the terminal device, a radio link indicated by the configuration information is the second case of the manner 2 or the manner 3, or there is no configuration information, and the manner of detecting, by the terminal device, a radio link is the second case of the manner 2 or the manner 3, the terminal device first detects the first radio link, and starts the second detection process after determining that the first radio link fails. If the manner of detecting, by the terminal device, a radio link indicated by the configuration information is the first case of the manner 2, or there is no configuration information, and the manner of detecting, by the terminal device, a radio link is the first case of the manner 2, S45 is an optional step. If S45 is performed, it indicates that the terminal device performs the first detection process. For example, the terminal device starts the second detection process after determining that the first radio link fails. If S45 is not performed, it indicates that the terminal device directly performs the second detection process without performing the first detection process. In addition, if the manner of detecting, by the terminal device, a radio link indicated by the configuration information is the first case or the second case of the manner 2, or there is no configuration information, and the manner of detecting, by the terminal device, a radio link is the first case or the second case of the manner 2, before S46, or rather, before the terminal device determines that the first radio link between the terminal device and the access network device fails, the terminal device sends trigger information, for example, a trigger message, to the access network device. The trigger information may be used to request to detect the second radio link, or the trigger information is used to request downlink information of the second radio link.

The terminal device detects the second radio link between the terminal device and the access network device to determine whether the second radio link fails, by using the following manners, but not limited to using the following manners:

1. A Manner of Using a Third Threshold

In a first implementation form of the manner of using a third threshold, in the second detection process, the terminal device determines whether an event that the downlink quality of the second radio link is less than the third threshold is detected for N2 or more than N2 times, to determine whether the second radio link fails. If the event that the downlink quality of the second radio link is less than the third threshold occurs for N2 or more than N2 times, the terminal device determines that the second radio link fails, or otherwise, the terminal device determines that the second radio link does not fail.

In an example, if the event, detected by the terminal device, that the downlink quality of the second radio link is less than the third threshold occurs for N2 or more than N2 consecutive times, the terminal device may determine that the second radio link fails.

In another example, if the terminal device detects, in timing duration of a fifth timer, that the event that the downlink quality of the second radio link is less than the third threshold occurs for N2 or more than N2 consecutive times, the terminal device may determine that the second radio link fails.

For example, when detecting, for the first time, the event that the downlink quality of the second radio link is less than the third threshold, the terminal device starts a timer, which is, for example, referred to as the fifth timer. The timing duration of the fifth timer forms a time window, for example, a time window T7. In the time window T7, if the event that the downlink quality of the second radio link is less than the third threshold is detected for N2 or more than N2 times, the terminal device determines that the second radio link fails. In such an example, the event that the downlink quality of the second radio link is less than the third threshold may be consecutively detected, or may not be consecutively detected. This detection manner is strict to link detection and can ensure effective data transmission.

In a second implementation form of the manner of using a third threshold, in the second detection process, the terminal device determines whether a proportion of a quantity of events, detected by the terminal device in timing duration of a fifth timer, that the downlink quality of the second radio link is less than the third threshold in a quantity of events that the terminal device detects the downlink quality of the second radio link in the timing duration of the fifth timer is greater than or equal to a fourth proportion threshold, to determine whether the second radio link fails. If the terminal device detects, in the timing duration of the fifth timer, that the proportion of the quantity of events that the downlink quality of the second radio link is less than the third threshold in the quantity of events that the terminal device detects the downlink quality of the second radio link in the timing duration of the fifth timer is greater than or equal to the fourth proportion threshold, the terminal device determines that the second radio link fails, or otherwise, the terminal device determines that the second radio link does not fail.

The fourth proportion threshold may be specified in a protocol, or may be configured by the access network device.

2. A Manner of Using a Fourth Threshold

In a first implementation form of the manner of using a fourth threshold, in the second detection process, the terminal device determines whether an event that the downlink quality of the second radio link is greater than the fourth threshold is detected for less than M2 times, to determine whether the second radio link fails. If the event that the downlink quality of the second radio link is greater than the fourth threshold occurs for less than M2 times, the terminal device determines that the second radio link fails, or otherwise, the terminal device determines that the second radio link does not fail.

In an example, if the terminal device detects that the event that the downlink quality of the second radio link is greater than the fourth threshold occurs for less than M2 consecutive times, the terminal device may determine that the second radio link fails.

In another example, if the terminal device detects, in timing duration of a sixth timer, that the event that the downlink quality of the second radio link is greater than the fourth threshold occurs for less than M2 times, the terminal device may determine that the second radio link fails.

For example, when detecting, for the first time, the event that the downlink quality of the second radio link is greater than the fourth threshold, the terminal device starts a timer, which is, for example, referred to as the sixth timer. The timing duration of the sixth timer forms a time window, for example, a time window T8. In the time window T8, if detecting that the event that the downlink quality of the second radio link is greater than the fourth threshold occurs for M2 or more than M2 times, the terminal device determines that the second radio link does not fail. Otherwise, if detecting that the event that the downlink quality of the second radio link is greater than the fourth threshold occurs for less than M2 times, the terminal device determines that the second radio link fails. In such an example, the event that the downlink quality of the second radio link is greater than the fourth threshold may be consecutively detected, or may not be consecutively detected. This detection manner is strict to link detection and can ensure effective data transmission.

In a second implementation form of the manner of using a fourth threshold, in the second detection process, the terminal device determines whether a proportion of a quantity of events, detected by the terminal device in timing duration of a sixth timer, that the downlink quality of the second radio link is greater than the fourth threshold in a quantity of events that the terminal device detects the downlink quality of the second radio link in the timing duration of the sixth timer is less than a fifth proportion threshold, to determine that the second radio link fails. If the terminal device determines that the proportion of the quantity of events, detected by the terminal device in the timing duration of the sixth timer, that the downlink quality of the second radio link is greater than the fourth threshold in the quantity of events that the terminal device detects the downlink quality of the second radio link in the timing duration of the sixth timer is less than the fifth proportion threshold, the terminal device determines that the second radio link fails, or otherwise, the terminal device determines that the second radio link does not fail.

The fifth proportion threshold may be specified in a protocol, or may be configured by the access network device.

3. A manner of using a third threshold and a fourth threshold. This manner is equivalent to combining the manner of using a third threshold and the manner of using a fourth threshold that are described above.

In a first implementation form of the manner of using a third threshold and a fourth threshold, in the second detection process, it is determined whether an event that the downlink quality of the second radio link is less than the third threshold is detected for N2 or more than N2 times, and if the event that the downlink quality of the second radio link is less than the third threshold occurs for N2 or more than N2 times, it is determined whether an event that the downlink quality of the second radio link is greater than the fourth threshold is detected for less than M2 times, to determine whether the second radio link fails. If the event that the downlink quality of the second radio link is greater than the fourth threshold is detected for less than M2 times, it is determined that the second radio link fails, or otherwise, it is determined that the second radio link does not fail.

"Determining that the event that the downlink quality of the second radio link is less than the third threshold is detected for N2 or more than N2 times" may be replaced with the following step: "determining that a proportion of a quantity of" events detected by the terminal device in timing duration of a seventh timer that the downlink quality of the second radio link is less than the third threshold in a quantity of events that the terminal device detects the downlink quality of the second radio link in the timing duration of the seventh timer is greater than the sixth proportion threshold. In addition, "determining that the event that the downlink quality of the second radio link is greater than the fourth threshold is detected for less than M2 times" may be replaced with the following step: "determining that a proportion of a quantity of" events, detected by the terminal device in timing duration of an eighth timer, that the downlink quality of the second radio link is greater than the fourth threshold in a quantity of events that the downlink quality of the second radio link is detected in the timing duration of the eighth timer is less than a seventh proportion threshold. The sixth proportion threshold may be specified in a protocol, or may be configured by the access network device. The seventh proportion threshold may be specified in a protocol, or may be configured by the access network device.

In the manner of using a third threshold and a fourth threshold, both the two steps may be replaced, or either of the two steps may be replaced. Manners obtained after the step/the steps is/are replaced may be used as different implementation forms of the manner of using a third threshold and a fourth threshold.

That is, in a second implementation form of the manner of using a third threshold and a fourth threshold, in the second detection process, the terminal device determines whether an event that the downlink quality of the second radio link is less than the third threshold is detected for N2 or more than N2 times, and if the event that the downlink quality of the second radio link is less than the third threshold occurs for N2 or more than N2 times, determines whether a proportion of a quantity of events, detected in timing duration of an eighth timer, that the downlink quality of the second radio link is greater than the fourth threshold in a quantity of events that the downlink quality of the second radio link is detected in the timing duration of the eighth timer is less than a seventh proportion threshold. If it is determined that the proportion of the quantity of events, detected in the timing duration of the eighth timer, that the downlink quality of the second radio link is greater than the fourth threshold in the quantity of events that the downlink quality of the second radio link is detected in the timing duration of the eighth timer is less than the seventh proportion threshold, it is determined that the second radio link fails, or otherwise, it is determined that the second radio link does not fail.

In a third implementation form of the manner of using a third threshold and a fourth threshold, in the second detection process, it is determined whether a proportion of a quantity of events, detected by the terminal device in timing duration of a seventh timer, that the downlink quality of the second radio link is less than the third threshold in a quantity of events that the terminal device detects the downlink quality of the second radio link in the timing duration of the seventh timer is greater than a sixth proportion threshold, and if the proportion is greater than the sixth proportion threshold, it is determined whether an event that the downlink quality of the second radio link is greater than the fourth threshold is detected for less than M2 times, to determine whether the second radio link fails. If the event that the downlink quality of the second radio link is greater than the fourth threshold is detected for less than M2 times, it is determined that the second radio link fails, or otherwise, it is determined that the second radio link does not fail.

In a fourth implementation form of the manner of using a third threshold and a fourth threshold, in the second detection process, it is determined whether a proportion of a quantity of events, detected by the terminal device in timing duration of a seventh timer, that the downlink quality of the second radio link is less than the third threshold in a quantity of events that the terminal device detects the downlink quality of the second radio link in the timing duration of the seventh timer is greater than a sixth proportion threshold, and if the proportion is greater than the sixth proportion threshold, it is determined whether a proportion of a quantity of events, detected in timing duration of an eighth timer, that the downlink quality of the second radio link is greater than the fourth threshold in a quantity of events that the downlink quality of the second radio link is detected in the timing duration of the eighth timer is less than a seventh proportion threshold. If it is determined that the proportion of the quantity of events, detected in the timing duration of the eighth timer, that the downlink quality of the second radio link is greater than the fourth threshold in the quantity of events that the downlink quality of the second radio link is detected in the timing duration of the eighth timer is less than the seventh proportion threshold, it is determined that the second radio link fails, or otherwise, it is determined that the second radio link does not fail.

In a first example, if the event, detected by the terminal device, that the downlink quality of the second radio link is less than the third threshold occurs for N2 or more than N2 consecutive times, the terminal device continues to determine whether the event that the downlink quality of the second radio link is greater than the fourth threshold is detected for less than M2 consecutive times. If the terminal device detects that the event that the downlink quality of the second radio link is greater than the fourth threshold occurs for less than M2 consecutive times, the terminal device determines that the second radio link fails. Otherwise, if the terminal device detects that the event that the downlink quality of the second radio link is greater than the fourth threshold occurs for M2 or more than M2 consecutive times, the terminal device determines that the second radio link does not fail.

In a second example, if the event, detected by the terminal device, that the downlink quality of the second radio link is less than the third threshold occurs for N2 or more than N2 consecutive times, the terminal device continues to determine whether the event, detected in the timing duration of the eighth timer, that the downlink quality of the second radio link is greater than the fourth threshold occurs for less than M2 times. If the event detected in the timing duration of the eighth timer that the downlink quality of the second radio link is greater than the fourth threshold occurs for less than M2 times, the terminal device determines that the second radio link fails. Otherwise, if the event detected in the timing duration of the eighth timer that the downlink quality of the second radio link is greater than the fourth threshold occurs for M2 or more than M2 times, the terminal device determines that the second radio link does not fail.

For example, in the second example, "if the terminal device determines that the event detected, in the timing duration of the eighth timer, that the downlink quality of the second radio link is greater than the fourth threshold occurs for less than M2 consecutive times, the terminal device determines that the second radio link fails" may be replaced with the following step: "if a proportion of a quantity of events, detected by the terminal device in the timing duration of the eighth timer, that the downlink quality of the second radio link is greater than the fourth threshold in a quantity of events that the downlink quality of the second radio link is detected in the timing duration of the eighth timer is less than the seventh proportion threshold, it is determined that the second radio link fails".

In a third example, if the event, detected by the terminal device in the timing duration of the seventh timer, that the downlink quality of the second radio link is less than the third threshold occurs for N2 or more than N2 times, the terminal device continues to determine whether the event that the downlink quality of the second radio link is greater than the fourth threshold is detected for less than M2 consecutive times. If the terminal device detects that the event that the downlink quality of the second radio link is greater than the fourth threshold occurs for less than M2 consecutive times, the terminal device determines that the second radio link fails. Otherwise, if the terminal device detects that the event that the downlink quality of the second radio link is greater than the fourth threshold occurs for M2 or more than M2 consecutive times, the terminal device determines that the second radio link does not fail.

For example, in the third example, "the event, detected by the terminal device in the timing duration of the seventh timer, that the downlink quality of the second radio link is less than the third threshold occurs for N2 or more than N2 times" may be replaced with the following step: "a proportion of the quantity of the events, detected by the terminal device in the timing duration of the seventh timer, that the downlink quality of the second radio link is less than the third threshold in a quantity of events that the terminal device detects the downlink quality of the second radio link in the timing duration of the seventh timer is greater than a sixth proportion threshold.

In a fourth example, if the event, detected by the terminal device in the timing duration of the seventh timer, that the downlink quality of the second radio link is less than the third threshold occurs for N2 or more than N2 times, the terminal device continues to determine whether the event, detected by the terminal device in the timing duration of the eighth timer, that the downlink quality of the second radio link is greater than the fourth threshold occurs for less than M2 times. If the terminal device detects, in the timing duration of the eighth timer, that the event that the downlink quality of the second radio link is greater than the fourth threshold occurs for less than M2 times, the terminal device determines that the second radio link fails. Otherwise, if the terminal device detects, in the timing duration of the eighth timer, that the event that the downlink quality of the second radio link is greater than the fourth threshold occurs for M2 or more than M2 times, the terminal device determines that the second radio link does not fail.

In the fourth example, both the two steps of "if the terminal device determines that the event, detected in the timing duration of the eighth timer, that the downlink quality of the second radio link is greater than the fourth threshold occurs for less than M2 consecutive times, the terminal device determines that the second radio link fails" and "the event, detected by the terminal device in the timing duration of the seventh timer, that the downlink quality of the second radio link is less than the third threshold occurs for N2 or more than N2 times" may be correspondingly replaced. For details, refer to the descriptions of the second example and the third example.

For example, when detecting, for the first time, the event that the downlink quality of the second radio link is less than the third threshold, the terminal device starts the seventh timer. The timing duration of the seventh timer forms a time window, for example, a time window T9. In the time window T9, if the event that the downlink quality of the second radio link is less than the third threshold is detected for N2 or more than N2 times, the terminal device continues to determine whether the event that the downlink quality of the second radio link is greater than the fourth threshold is detected for less than M2 consecutive times. Specifically, when detecting, for the first time, the event that the downlink quality of the second radio link is greater than the fourth threshold, the terminal device starts the eighth timer. The timing duration of the eighth timer forms a time window, for example, a time window T10. In the time window T10, if detecting that the event that the downlink quality of the second radio link is greater than the fourth threshold occurs for M2 or more than M2 times, the terminal device determines that the second radio link does not fail. Otherwise, if detecting that the event that the downlink quality of the second radio link is greater than the fourth threshold occurs for less than M2 times, the terminal device determines that the second radio link fails. In such an example, the event that the downlink quality of the second radio link is less than the third threshold may be consecutively detected, or may not be consecutively detected. Similarly, the event that the downlink quality of the second radio link is greater than the fourth threshold may be consecutively detected, or may not be consecutively detected. This detection manner is strict to link detection and can ensure effective data transmission. This detection manner is strict to link detection and can ensure effective data transmission.

Which one of the foregoing manners is used by the terminal device to detect the second radio link may be specified in a protocol, or configured by the network device, or configured in another manner. This is not specifically limited.

A second radio link failure is a second radio link failure that is determined by the terminal device based on a second radio link quality assessment mechanism corresponding to the second radio link, or a second radio link failure that is determined by the terminal device based on a second radio link quality assessment mechanism corresponding to the second detection process. The second radio link quality assessment mechanism herein may include an assessment mechanism that is used by the terminal device in an assessment process. For example, the assessment mechanism includes at least one of the following: downlink information used by the terminal device to assess the second radio link (to assess a second radio link failure and/or assess second radio link synchronization), the third threshold, the fourth threshold, the timing duration of the fifth timer, the timing duration of the sixth timer, the timing duration of the seventh timer, the timing duration of the eighth timer, the value of N2, and the value of M2 that are used by the terminal device, a parameter used by the terminal device to calculate the downlink quality of the second radio link, or the like.

The second radio link quality assessment mechanism corresponding to the second radio link may be different from the first radio link quality assessment mechanism corresponding to the first radio link. That the first radio link quality assessment mechanism is different from the second radio link quality assessment mechanism may be understood as: values of corresponding K items in at least one item included in the first radio link quality assessment mechanism and values of corresponding K items in at least one item included in the second radio link quality assessment mechanism are different, where K is a positive integer.

For example, the first radio link quality assessment mechanism includes a first threshold, the second radio link quality assessment mechanism includes a third threshold corresponding to the first threshold, and the first threshold and the third threshold may be different. For example, the first threshold may be greater than the third threshold (that is, the third threshold is less than or equal to the first threshold). Alternatively, the first threshold may be less than or equal to the third threshold. A value relationship between the first threshold and the third threshold is related to a parameter used to measure downlink quality.

Alternatively, for example, the first radio link quality assessment mechanism includes a second threshold, the second radio link quality assessment mechanism includes a fourth threshold corresponding to the second threshold, and the second threshold and the fourth threshold may be different. For example, the second threshold may be greater than the fourth threshold (that is, the fourth threshold is less than or equal to the second threshold). Alternatively, the second threshold may be less than or equal to the fourth threshold. A value relationship between the second threshold and the fourth threshold is related to a parameter used to measure downlink quality.

Alternatively, for example, the first radio link quality assessment mechanism includes N1, the second radio link quality assessment mechanism includes N2 corresponding to N1, and a value of N1 and a value of N2 may be different. For another example, the first radio link quality assessment mechanism includes a second threshold and M1, the second radio link quality assessment mechanism includes a fourth threshold corresponding to the second threshold and M2 corresponding to M1, and the second threshold and the fourth threshold may be different and a value of M1 and a value of M2 may be different.

For the first threshold, the second threshold, the third threshold, and the fourth threshold, in this embodiment of this application, the third threshold is less than or equal to the first threshold, and/or the fourth threshold is less than or equal to the second threshold. In other words, the third threshold is less than or equal to the first threshold, or the fourth threshold is less than or equal to the second threshold, or the third threshold is less than or equal to the first threshold and the fourth threshold is less than or equal to the second threshold. For example, if all the first threshold, the second threshold, the third threshold, and the fourth threshold are SINR values, this value determining manner may be used.

Alternatively, in this embodiment of this application, the third threshold is greater than the first threshold, and/or the fourth threshold is greater than the second threshold. In other words, the third threshold is greater than the first threshold, or the fourth threshold is greater than the second threshold, or the third threshold is greater than the first threshold and the fourth threshold is greater than the second threshold. For example, if all the first threshold, the second threshold, the third threshold, and the fourth threshold are BLER values or BER values, this value determining manner may be used.

For example, the first threshold included in the first radio link quality assessment mechanism is different from the third threshold included in the second radio link quality assessment mechanism. For example, the first threshold included in the first radio link quality assessment mechanism is specifically a first SINR, and the third threshold included in the second radio link quality assessment mechanism is specifically a second SINR. In this case, the first threshold is greater than the third threshold, that is, a value of the first SINR is greater than a value of the second SINR. In this case, after determining, based on the first radio link quality assessment mechanism, that the first radio link fails, the terminal device may further determine a state of the second radio link between the terminal device and the access network device based on the second radio link quality assessment mechanism. Because the value of the second SINR corresponding to the second radio link quality assessment mechanism is less than the value of the first SINR corresponding to the first radio link quality assessment mechanism, the terminal device may probably determine, based on the second radio link quality assessment mechanism, that the second radio link between the terminal device and the access network device can work normally. This is relatively applicable to the following scenario: For example, the first radio link is a radio link corresponding to a URLLC service, and the second radio link is a radio link corresponding to eMBB. The terminal device has both a URLLC service requirement and an eMBB service requirement. Because the URLLC service requires much higher reliability than the eMBB service, if a working point corresponding to the URLLC service is represented by, for example, an SINR value, the working point corresponding to the URLLC service is greater than a working point (for example, also represented by an SINR value) corresponding to the eMBB service. When the URLLC service of the terminal device cannot meet a requirement, the terminal device may fall back to an eMBB working mode, because the eMBB working mode requires relatively low on an SINR. Therefore, even if a normal service of the URLLC service cannot be ensured if the first radio link between the terminal device and the access network device is used, there is still a relatively high probability that the eMBB service of the terminal device can be ensured if the second radio link between the terminal device and the access network device is used. Even if the terminal device currently has no requirement on the eMBB service, according to the technical solutions provided in this embodiment of this application, the terminal device can maintain the second radio link between the terminal device and the access network device based on the second radio link quality assessment mechanism corresponding to the eMBB service, and does not need to perform an RRC reestablishment process or enter an RRC idle state.

For another example, the first threshold included in the first radio link quality assessment mechanism is specifically a first BLER, and the third threshold included in the second radio link quality assessment mechanism is specifically a second BLER. Generally, a larger SINR value indicates a smaller BLER value. Therefore, in this case, the first threshold is less than or equal to the third threshold, that is, the first BLER corresponding to the first radio link quality assessment mechanism may be less than or equal to the second BLER corresponding to the second radio link quality assessment mechanism.

For another example, a parameter that is used by the terminal device to calculate the downlink quality of the first radio link and that is included in the first radio link quality assessment mechanism is different from a parameter that is used by the terminal device to calculate the downlink quality of the second radio link and that is included in the second radio link quality assessment mechanism. Herein, the parameter that is used by the terminal device to calculate the downlink quality of the first radio link is for example, a quantity of time units considered when the terminal device calculates the downlink quality of the first radio link. Similarly, the parameter that is used by the terminal device to calculate the downlink quality of the second radio link is for example, a quantity of time units considered when the terminal device calculates the downlink quality of the second radio link. For example, in the first radio link quality assessment mechanism, the terminal device determines the downlink quality of the first radio link based on one or more downlink reference signal that is sent by the access network device in K time units. In other words, the downlink quality of the first radio link is the downlink quality of the first radio link in the K time units. For example, the downlink quality is represented by an SINR, where K is a positive integer. In the second radio link quality assessment mechanism, the terminal device determines the downlink quality of the second radio link based on a downlink reference signal that is sent by the access network device in P time units. In other words, the downlink quality of the second radio link is the downlink quality of the second radio link in the P time units. For example, the downlink quality is represented by an SINR, where P is a positive integer. For example, the downlink quality is represented by an SINR. For example, K is less than or equal to P. It may be understood that, similar to machine type communication (MTC), duplicate transmission of same data can improve a channel state experienced by the terminal device during data transmission. Therefore, channel state monitoring is performed on downlink information such as downlink reference signals in a plurality of time units, in other words, energy of the downlink reference signals in the plurality of time units is accumulated, so that coverage for the terminal device is further improved. For example, the first radio link is a non-CE link, or referred to as a broadband link, and the second radio link is a CE link, or referred to as a narrowband link. For a terminal device having both a non-CE capability and a CE capability, it may be understood that although the terminal device may ensure coverage for data transmission based on a CE mechanism, duplicate transmission performed for many times increases power consumption of the terminal device. Therefore, for the terminal device having both a non-CE capability and a CE capability, whether the first radio link between the terminal device and the access network device can support the data transmission may be first determined based on a link quality assessment mechanism (which may correspond to the first radio link quality assessment mechanism in this embodiment of this application) corresponding to the non-CE capability. After determining, based on the link quality assessment mechanism corresponding to the non-CE, that the first radio link fails, the terminal device does not need to perform RRC reestablishment or enter an RRC idle state, but may determine, based on a downlink quality assessment mechanism corresponding to the CE, whether the second radio link between the access network device and the terminal device fails. For example, in an NR system, if a terminal device has a capability of receiving both a broadband data service and a narrowband data duplication service, the terminal device may generally detect the first radio link based on the first radio link quality assessment mechanism corresponding to the non-CE. When the terminal device enters an area, for example, an underground parking lot or a tunnel, with poor coverage, when the terminal device detects that the first radio link corresponding to the non-CE capability fails, the terminal device may start a link quality assessment mechanism (which may correspond to the second radio link quality assessment mechanism in this embodiment of this application) corresponding to the CE capability, to determine whether the second radio link fails, and further prevent the terminal device, as much as possible, from performing RRC reestablishment or entering the RRC idle state, thereby simplifying a process of maintaining data transmission between the access network device and the terminal device.

It may be understood that, in the foregoing examples, because K is less than or equal to P, when channel states that are assessed by the terminal device on the first radio link and the second radio link correspond to a same SINR, an SINR corresponding to the channel state that is of the first radio link and that corresponds to at least one of the K time units is greater than an SINR that corresponds to the channel state of the second radio link and corresponds to at least one of the P time units. This is because more downlink information energy can be accumulated in the P time units, where the downlink information is used to assess quality of a radio link.

It should be noted that, in this embodiment of this application, the non-CE capability and the CE capability may be distinguished based on different quantities of duplication times used in data transmission. For example, the non-CE capability may indicate that a duplication transmission technology does not need to be used in data transmission, and the CE capability may indicate that the duplication transmission technology needs to be used in data transmission. Alternatively, for another example, the non-CE capability may indicate that a duplication transmission technology is not used in data transmission, or even if the duplication transmission technology is used, a used maximum quantity of duplication times is K1, and the CE capability indicates that the duplication transmission technology is used in data transmission and a used minimum quantity of duplication times is K2. K1 is not greater than K2.

In this embodiment of this application, the time unit may be one slot, or may be a non-slot whose transmission duration is less than one slot, or may be a time unit of other transmission duration. Duration corresponding to a slot (which is slot duration) may be related to a subcarrier spacing (SCS). Alternatively, a time unit may be a subframe or a radio frame. Duration of one subframe may be 1 ms, and duration of one radio frame may be 10 ms. The time unit may alternatively be an integer quantity of orthogonal frequency division multiplexing symbols, and the time unit may alternatively be represented in another form. This is not specifically limited.

S47. If determining that the second radio link does not fail, communicate with the access network device over the second radio link.

If the terminal device determines that the second radio link does not fail, the terminal device may be switched from the first radio link to the second radio link, to continue to communicate with the access network device over the second radio link.

If the terminal device sends the trigger information to the access network device before the first radio link fails, after receiving the trigger information, the access network device may further send the downlink information of the second radio link to the terminal device. For example, the access network device may send the downlink information of the second radio link to the terminal device by using a dedicated message. For example, the dedicated message is a radio resource control (RRC) dedicated message. As described in S44, the access network device may broadcast the downlink information of the second radio link in advance over the first radio link. In this case, the terminal device that does not send the trigger information to the access network device receives only the downlink information that is of the second radio link and that is broadcast by the access network device over the first radio link. However, the terminal device that sends the trigger information to the access network device may not only receive the downlink information that is of the second radio link and that is broadcast by the access network device over the first radio link, but also receive the downlink information that is of the second radio link and that is sent by the access network device to the terminal device after the access network device receives the trigger information from the terminal device. It is equivalent to providing that this type of terminal device receives two pieces of downlink information of the second radio link. Because a period of time from a time at which the access network device broadcasts the downlink information of the second radio link over the first radio link to a time at which the access network device receives the trigger information may have elapsed, the downlink information of the second radio link may have changed. It is clear that the downlink information that is of the second radio link and that is sent by the access network device to the terminal device after the access network device receives the trigger information from the terminal device is more accurate. Therefore, for the terminal device that receives two pieces of downlink information of the second radio link, the downlink information that is of the second radio link and that is sent by the access network device to the terminal device after the access network device receives the trigger information from the terminal device may be used as a reference, and the downlink information that is of the second radio link and that is sent by the access network device to the terminal device after the access network device receives the trigger information from the terminal device may be used to detect the second radio link, to improve detection accuracy.

In an implementation, after communicating with the access network device over the second radio link, or after being switched from the first radio link to the second radio link, the terminal device may further send acknowledgment information to the access network device. The acknowledgment information is used to indicate that subsequently the terminal device is about to maintain communication with the access network device over the second radio link, or the acknowledgment information is used to indicate that the terminal device is switched from the first radio link to the second radio link. An advantage of sending the acknowledgment information is that subsequently the access network device may maintain a data service with the terminal device by using a data transmission technology corresponding to the second radio link, and effectively use a spectrum resource. For example, if the terminal device has both a non-CE capability (corresponding to the first radio link) and a CE capability (corresponding to the second radio link), after receiving the acknowledgment information, the access network device may maintain communication with the terminal device by using a CE transmission technology (for example, duplicate transmission). An implementation form of the acknowledgment information may be a sequence, or may be information. For example, the acknowledgment information may be a scheduling request (SR) or a preamble sequence used in a random access channel (RACH). The acknowledgment information may alternatively have another representation form. This is not specifically limited. A time domain resource and/or a frequency domain resource carrying the acknowledgment information may be notified by the access network device to the terminal device in advance.

For example, the first radio link corresponds to the non-CE capability, and the second radio link corresponds to the CE capability. In this case, on the second radio link, coverage for the terminal device is improved by performing duplicate sending for a plurality of times. Therefore, compared with the first radio link, the second radio link consumes more resources in communication. Therefore, it is still expected that the terminal device can work on the first radio link as much as possible. In this case, if determining that the second radio link does not fail, the terminal device may further obtain the downlink information of the first radio link, to detect the first radio link. The terminal device may obtain stored downlink information of the first radio link. Alternatively, in S45, if the terminal device needs to determine that the first radio link fails, the terminal device naturally needs to detect the first radio link. Therefore, it is considered that the terminal device obtains the downlink information of the first radio link. However, another period of time has elapsed, after the terminal device determines that the second radio link does not fail. In this period of time, the downlink information of the first radio link may change again. Therefore, the terminal device may obtain the downlink information of the first radio link again from the access network device. If the terminal device needs to obtain the downlink information of the first radio link from the access network device, the terminal device may send a request message to the access network device if determining that the second radio link does not fail. The request message is used to request the downlink information of the first radio link, or is used to request to detect the first radio link. After receiving the request message from the terminal device, the access network device may send the downlink information of the first radio link to the terminal device. Alternatively, the terminal device may not need to send a request message. For example, the access network device may determine, based on quality of the second radio link between the terminal device and the access network device, whether the terminal device can maintain communication with the access network device still over the first radio link. The quality of the second radio link may be represented by, for example, information such as RSRQ, RSRP, and CSI corresponding to the second radio link. If the terminal device sends, to the access network device, acknowledgment information indicating that the terminal device has been switched from the first radio link to the second radio link for working, after receiving the acknowledgment information from the terminal device, the access network device may send the downlink information of the first radio link to the terminal device without requesting the downlink information of the first radio link from the terminal device, thereby saving transmission resources.

The foregoing describes a case in which the terminal device determines that the second radio link does not fail. If the terminal device determines that the second radio link fails, the terminal device may perform RRC reestablishment with the access network device. For example, the terminal device may reestablish the second radio link. If the RRC reestablishment performed on the second radio link succeeds, the terminal device may communicate with the access network device over the second radio link. If the RRC reestablishment performed on the second radio link fails, the terminal device may enter an RRC idle state. Alternatively, if determining that the second radio link fails, the terminal device may directly enter the RRC idle state. A specific behavior of the terminal device after the terminal device determines that the second radio link fails is not limited.

In this embodiment of this application, if determining that the first radio link fails, the terminal device may further detect the second radio link. If the second radio link does not fail, the terminal device may continue to communicate with the access network device over the second radio link, and does not need to perform RRC reestablishment on the first radio link. This reduces an unnecessary RRC reestablishment process, and the terminal device does not need to fall back to the RRC idle state, so that the terminal device can continue to work normally.

The following describes, with reference to the accompanying drawings, apparatuses configured to implement the foregoing method in the embodiments of this application. Therefore, all the foregoing content may be used in subsequent embodiments, and repeated content is not described again.

Figure 5:
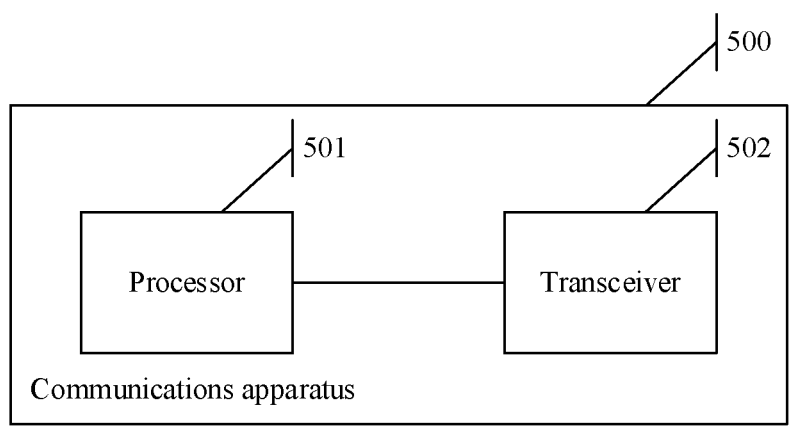
FIG. 5 is a schematic diagram of a communications apparatus that can implement functions of a terminal device according to an embodiment of this application.

FIG. 5 is a schematic structural diagram of a communications apparatus 500. The communications apparatus 500 may implement functions of the terminal device described above. The communications apparatus 500 may be the terminal device described above, or may be a chip disposed in the terminal device described above. The communications apparatus 500 may include a processor 501 and a transceiver 502. The processor 501 may be configured to perform S45, S46, and S47 in the embodiment shown in FIG. 4, and/or support another process of the technology described in this specification. The transceiver 502 may be configured to perform S42 and S44 in the embodiment shown in FIG. 4, and/or configured to support another process of the technology described in this specification.

For example, the processor 501 is configured to determine that a first radio link to an access network device fails.

The processor 501 is further configured to detect a second radio link to the access network device, to determine whether the second radio link fails.

The transceiver unit 502 is configured to: if it is determined that the second radio link does not fail, communicate with the access network device over the second radio link.

In an optional implementation, the processor 501 is configured to determine, in the following manners, that the first radio link to the access network device fails:
 if an event that downlink quality of the first radio link is less than a first threshold is detected for N1 or more than N1 times, determining that the first radio link fails; or
 if an event that downlink quality of the first radio link is less than a first threshold is detected for N1 or more than N1 times, and if an event that the downlink quality of the first radio link is greater than a second threshold is detected for less than M1 times, determining that the first radio link fails, where the second threshold is greater than or equal to the first threshold.

In an optional implementation, the processor 501 is configured to detect the second radio link to the access network device in the following manners, to determine whether the second radio link fails:
 if determining that an event that downlink quality of the second radio link is less than a third threshold is detected for N2 or more than N2 times, determining that the second radio link fails; or
 if determining that an event that downlink quality of the second radio link is greater than a fourth threshold is detected for less than M2 times, determining that the second radio link fails; or
 determining that an event that downlink quality of the second radio link is less than a third threshold is detected for N2 or more than N2 times, and if determining that the event that the downlink quality of the second radio link is less than the third threshold is detected for N2 or more than N2 times, and if determining that an event that the downlink quality of the second radio link is greater than a fourth threshold is detected for less than M2 times, determining that the second radio link fails.

In an optional implementation, the third threshold is less than or equal to the first threshold, and/or the fourth threshold is less than or equal to the second threshold.

In an optional implementation, the downlink quality of the first radio link is downlink quality of the first radio link in K time units, and/or the downlink quality of the second radio link is downlink quality of the second radio link in P time units, where both K and P are positive integers, and K is less than or equal to P.

In an optional implementation, the transceiver 502 is further configured to:
 receive downlink information that is of the second radio link and that is broadcast by the access network device over the first radio link, where the downlink information of the second radio link is used to detect the downlink quality of the second radio link.

In an optional implementation, the transceiver unit is further configured to:
 before it is determined that the first radio link to the access network device fails, send trigger information to the access network device, where the trigger information is used to request to detect the second radio link, or used to request the downlink information of the second radio link.

In an optional implementation, the transceiver 502 is further configured to:
 if it is determined that the second radio link does not fail, send acknowledgment information to the access network device, where the acknowledgment information is used to indicate that a terminal device is switched from the first radio link to the second radio link.

In an optional implementation, the processor 501 is further configured to:
 enter an RRC idle state if determining that the second radio link fails; or
 perform RRC reestablishment with the access network device if determining that the second radio link fails.

In an optional implementation, the transceiver 502 is further configured to:
 send capability information to the access network device, where the capability information is used to indicate that the terminal device has a capability of detecting the first radio link and a capability of detecting the second radio link, or is used to indicate that the terminal device has a capability of detecting the second radio link.

In an optional implementation, the processor 501 is further configured to:
obtain downlink information of the first radio link if determining that the second radio link does not fail; and
detect the first radio link based on the downlink information of the first radio link.

In an optional implementation, bandwidth of the first radio link is greater than bandwidth of the second radio link.

All related content of the steps in the foregoing method embodiment may be cited in function descriptions of corresponding function modules. Details are not described herein again.

Figure 6:
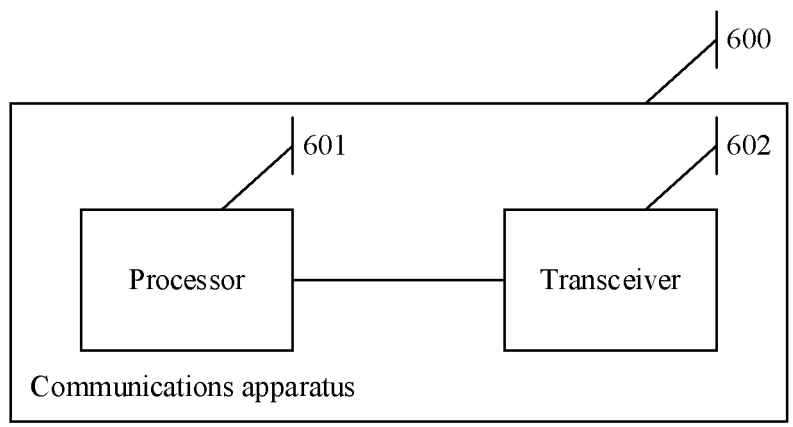
FIG. 6 is a schematic diagram of a communications apparatus that can implement functions of a network device according to an embodiment of this application.

FIG. 6 is a schematic structural diagram of a communications apparatus 600. The communications apparatus 600 may implement functions of the network device described above. The communications apparatus 600 may be the network device described in the foregoing specification, or may be a chip disposed in the network device described in the foregoing specification. The communications apparatus 600 may include a processor 601 and a transceiver 602. The processor 601 may be configured to perform S41 and S43 in the embodiment shown in FIG. 4, and/or support another process of the technology described in this specification. The transceiver 602 may be configured to perform S42 and S44 in the embodiment shown in FIG. 4, and/or configured to support another process of the technology described in this specification.

For example, the processor 601 is configured to determine downlink information of a second radio link to a terminal device, where the downlink information of the second radio link is used by the terminal device to detect downlink quality of the second radio link.

The transceiver unit 602 is configured to broadcast the downlink information of the second radio link to the terminal device over a first radio link to the terminal device.

In an optional implementation, the transceiver 602 is further configured to:
receive acknowledgment information from the terminal device, where the acknowledgment information is used to indicate that a terminal device is switched from the first radio link to the second radio link.

In an optional implementation, the transceiver 602 is further configured to:
send downlink information of the first radio link to the terminal device, where the downlink information of the first radio link is used by the terminal device to detect downlink quality of the first radio link.

In an optional implementation, the transceiver 602 is further configured to:
receive capability information from the terminal device, where the capability information is used to indicate that the terminal device has a capability of detecting the first radio link and a capability of detecting the second radio link, or is used to indicate that the terminal device has a capability of detecting the second radio link.

In an optional implementation, the transceiver 602 is further configured to:
receive trigger information from the terminal device, where the trigger information is used to request to detect the second radio link, or used to request the downlink information of the second radio link.

In an optional implementation,
the processor 601 is further configured to determine a manner of detecting, by the terminal device, a radio link; and
the transceiver 602 is further configured to send configuration information to the terminal device, where the configuration information is used to indicate the manner of detecting a radio link, and the manner of detecting a radio link includes at least one of the following:
detecting only the first radio link;
detecting the first radio link, and detecting the second radio link after an access network device is triggered; or
detecting the first radio link and the second radio link.

In an optional implementation, bandwidth of the first radio link is greater than bandwidth of the second radio link.

All related content of the steps in the foregoing method embodiment may be cited in function descriptions of corresponding function modules. Details are not described herein again.

Figure 7A:
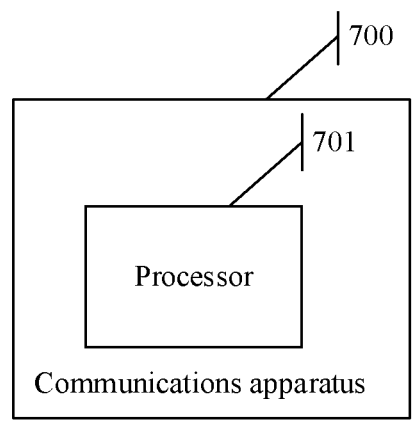
FIG. 7A and FIG. 7B are two schematic diagrams of a communications apparatus according to an embodiment of this application.

In a simple embodiment, a person skilled in the art may figure out that the communications apparatus 500 or the communications apparatus 600 may alternatively be implemented by using a structure of a communications apparatus 700 shown in FIG. 7A. The communications apparatus 700 may implement functions of the terminal device or the network device described above. The communication apparatus 700 may include a processor 701.

When the communications apparatus 700 is configured to implement the functions of the network device described above, the processor 701 may be configured to perform S41 and S43 in the embodiment shown in FIG. 4, and/or configured to support another process of the technology described in this specification. Alternatively, when the communications apparatus 700 is configured to implement the functions of the terminal device described above, the processor 701 may be configured to perform S45, S46, and S47 in the embodiment shown in FIG. 4, and/or configured to support another process of the technology described in this specification.

The communications apparatus 700 may be implemented by using a field-programmable gate array (FPGA), an application-specific integrated circuit (application specific integrated circuit, ASIC), a system on chip (SoC), a central processing unit (CPU), a network processor (NP), a digital signal processing circuit (DSP), a micro controller (MCU), or a programmable controller (PLD) or another integrated chip. In this case, the communications apparatus 600 may be disposed in the network device or the terminal device in the embodiments of this application, so that the network device or the terminal device implements the method provided in the embodiments of this application.

In an optional implementation, the communications apparatus 700 may include a transceiver component, configured to communicate with another device. When the communications apparatus 700 is configured to implement the functions of the network device or the terminal device described above, the transceiver component may be configured to perform S42 and S44 in the embodiment shown in FIG. 4, and/or configured to support another process of the technology described in this specification. For example, a transceiver component is a communications interface. If the communications apparatus 700 is a network device or a terminal device, the communications interface may be a transceiver in the network device or the terminal device, for example, the transceiver 502 or the transceiver 602. The transceiver is, for example, a radio frequency transceiver component in the network device or the terminal device. Alternatively, if the communications apparatus 700 is a chip disposed in the network device or the terminal device, the communications interface may be an input/output interface of the chip, for example, an input/output pin.

Figure 7B:
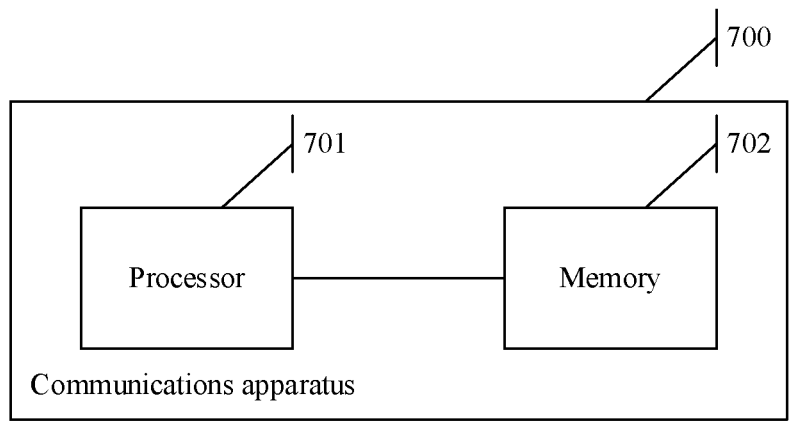

In an optional implementation, the communications apparatus 700 may further include a memory 702. Referring to FIG. 7B, the memory 702 is configured to store computer programs or instructions, and the processor 701 is configured to decode and execute the computer programs or the instructions. It should be understood that these computer programs or instructions may include function programs of the foregoing network device or the foregoing terminal device. When the function programs of the network device are decoded and executed by the processor 701, the network device is enabled to implement the functions of the network device in the method provided in the embodiment shown in FIG. 4 in the embodiments of this application. When function programs of the terminal device are decoded and executed by the processor 701, the terminal device can be enabled to implement the functions of the terminal device in the method provided in the embodiment shown in FIG. 4 in the embodiments of this application.

In another optional implementation, these function programs of the network device or the terminal device are stored in an external memory of the communications apparatus 700. When the function programs of the network device are decoded and executed by the processor 701, the memory 702 temporarily stores a part or all of content of the function programs of the network device. When the function programs of the terminal device are decoded and executed by the processor 701, the memory 702 temporarily stores a part or all of content of the function programs of the terminal device.

In another optional implementation, these function programs of the network device or the terminal device are stored in an internal memory 702 of the communications apparatus 700. When the internal memory 702 of the communications apparatus 700 stores the function programs of the network device, the communications apparatus 700 may be disposed in the network device in the embodiments of this application. When the internal memory 702 of the communications apparatus 700 stores the function programs of the terminal device, the communications apparatus 700 may be disposed in the terminal device in the embodiments of this application.

In still another optional implementation, some content of the function programs of the network device is stored in an external memory of the communications apparatus 700, and the other content of the function programs of the network device is stored in an internal memory 702 of the communications apparatus 700. Alternatively, some content of the function programs of the terminal device is stored in an external memory of the communications apparatus 700, and the other content of the function programs of the terminal device is stored in the internal memory 702 of the communications apparatus 700.

In the embodiments of this application, the communications apparatus 500, the communications apparatus 600, and the communications apparatus 700 are presented in a form in which each function module is obtained through division based on each corresponding function, or may be presented in a form in which each function module is obtained through division in an integrated manner. The "module" herein may be an ASIC, a processor and a memory that execute one or more software or firmware programs, an integrated logic circuit, and/or another component that can provide the foregoing functions.

In addition, the communications apparatus 500 provided in the embodiment shown in FIG. 5 may alternatively be implemented in another form. For example, the communications apparatus includes a processing unit and a transceiver unit. For example, the processing unit may be implemented by using the processor 501, and the transceiver unit may be implemented by using the transceiver 502. The processing unit may be configured to perform S45, S46, and S47 in the embodiment shown in FIG. 4, and/or support another process of the technology described in this specification. The transceiver unit may be configured to perform S42 and S44 in the embodiment shown in FIG. 4, and/or configured to support another process of the technology described in this specification.

For example, the processing unit is configured to determine that a first radio link to an access network device fails, where
  the processing unit is further configured to detect a second radio link to the access network device, to determine whether the second radio link fails; and
  the transceiver unit is configured to: if it is determined that the second radio link does not fail, communicate with the access network device over the second radio link.

All related content of the steps in the foregoing method embodiment may be cited in function descriptions of corresponding function modules. Details are not described herein again.

The communications apparatus 600 provided in the embodiment shown in FIG. 6 may alternatively be implemented in another form. For example, the communications apparatus includes a processing unit and a transceiver unit. For example, the processing unit may be implemented by using the processor 601, and the transceiver unit may be implemented by using the transceiver 602. The processing unit may be configured to perform S41 and S43 in the embodiment shown in FIG. 4, and/or support another process of the technology described in this specification. The transceiver unit may be configured to perform S42 and S44 in the embodiment shown in FIG. 4, and/or configured to support another process of the technology described in this specification.

For example, the processing unit is configured to determine downlink information of a second radio link to a terminal device, where the downlink information of the second radio link is used by the terminal device to detect downlink quality of the second radio link; and the transceiver unit is configured to broadcast the downlink information of the second radio link to the terminal device over a first radio link to the terminal device.

All related content of the steps in the foregoing method embodiment may be cited in function descriptions of corresponding function modules. Details are not described herein again.

The communications apparatus 500, the communications apparatus 600, and the communications apparatus 700 provided in the embodiments of this application may be configured to perform the method provided in the embodiment shown in FIG. 4. Therefore, for technical effects that can be achieved by the communications apparatuses, refer to the foregoing method embodiment. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a special-purpose computer, an embedded processor, or another programmable data processing device to generate a machine, so that an instruction that is executed by a processor of a computer or another programmable data processing device generates an apparatus configured to implement a specified function in one or more processes in the flowcharts and/or in one or more blocks in the block diagrams.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconducting medium (for example, a solid-state drive (SSD)), or the like.

Obviously, a person skilled in the art can make various modifications and variations to the embodiments of this application without departing from the spirit and scope of this application. In this way, this application is intended to cover these modifications and variations of the embodiments of this application provided that they fall within the scope of protection defined by the following claims and their equivalent technologies.

What is claimed is:

1. A link detection method, comprising:
   determining, by a terminal device, that a first radio link, between the terminal device and an access network device has failed;
   detecting, by the terminal device, a second radio link, between the terminal device and the access network device;
   receiving downlink information of the second radio link that is broadcast by the access network device over the first radio link, wherein the downlink information of the second radio link is used to detect a downlink quality of the second radio link;
   determining that the downlink quality of the second radio link is such that the second radio link is useable; and
   communicating with the access network device over the second radio link.

2. The method according to claim 1, wherein determining that the first radio link to the access network device failed comprises:
   determining at least N1 times that a downlink quality of the first radio link is less than a first threshold; or
   determining less than M1 times that the downlink quality of the first radio link is greater than a second threshold, wherein the second threshold is greater than or equal to the first threshold.

3. The method according to claim 2, wherein determining the downlink quality of the second radio link is such that the second radio link does not fail comprises:
   if determining less than N2 times that the downlink quality of the second radio link is less than a third threshold; or
   if determining at least M2 times that the downlink quality of the second radio link is greater than a fourth threshold then determining that the second radio link does not fail.

4. The method according to claim 3, wherein the third threshold is less than or equal to the first threshold, and/or the fourth threshold is less than or equal to the second threshold.

5. The method according to claim 3, wherein the downlink quality of the first radio link is in K time units, and/or the downlink quality of the second radio link is in P time units, wherein both K and P are positive integers, and K is less than or equal to P.

6. A link detection method, comprising:
   determining, by an access device, downlink information of a first radio link to a terminal device, wherein the first radio link is between the terminal device and the access device, and wherein the downlink information of the first radio link is used by the terminal device to detect a downlink quality of the first radio link;
   determining a manner of detecting, by the terminal device, only the first radio link or both of the first radio link and the second radio link;
   sending configuration information to the terminal device, wherein the configuration information is used to indicate the manner of detecting only the first radio link or both of the first radio link and the second radio link, wherein the manner of detecting only the first radio link or both of the first radio link and the second radio link comprises at least one of:
   detecting only the first radio link;
   detecting the first radio link, and detecting the second radio link after an access network device is triggered; or
   detecting the first radio link and the second radio link; and
   broadcasting, by the access device, the downlink information of the first radio link to the terminal device over a second radio link between the access device and the terminal device.

7. The method according to claim 6, wherein the method further comprises:
   receiving acknowledgment information from the terminal device, wherein the acknowledgment information is used to indicate that the terminal device is switched from the second radio link to the first radio link.

8. The method according to claim 7, wherein the method further comprises:
   sending downlink information of the second radio link to the terminal device, wherein the downlink information of the second radio link is used by the terminal device to detect a downlink quality of the second radio link.

9. The method according to claim 6, wherein the method further comprises:
   receiving, from the terminal device, capability information indicating that the terminal device has a capability of detecting the second radio link and/or a capability of detecting the first radio link.

10. The method according to claim 6, wherein the method further comprises:
receiving trigger information from the terminal device, wherein the trigger information is used to request to detect the first radio link, or used to request the downlink information of the first radio link.

11. A communications apparatus, comprising:
one or more processors, and a memory configured to store program instructions;
wherein, when executed by the one or more processors, the instructions cause the communications apparatus to determine that a first radio link between the communications apparatus and an access network device has failed, and
detect a second radio link, between the communications apparatus and the access network device, and determining a downlink quality of the second radio link;
determine that the downlink quality of the second radio link is such that the second radio link is usable; and
communicate with the access network device over the second radio link;
wherein the instructions cause the communications apparatus to determine that the first radio link to the access network device failed by:
determining at least N1 times that a downlink quality of the first radio link is less than a first threshold; or
determining less than M1 times that the downlink quality of the first radio link is greater than a second threshold, wherein the second threshold is greater than or equal to the first threshold, and
wherein the instructions cause the communications apparatus to determine that the downlink quality of the second radio link is such that the second radio link does not fail comprises:
if determining less than N2 times that the downlink quality of the second radio link is less than a third threshold, then determining that the second radio link does not fail.

12. The communications apparatus according to claim 11, wherein the downlink quality of the first radio link is in K time units, and/or the downlink quality of the second radio link is in P time units, wherein both K and P are positive integers, and K is less than or equal to P.

13. A communications apparatus, comprising:
one or more processors, and a memory configure to store program instructions;
wherein, when executed by the one or more processors, the instructions cause the communications apparatus to:
determine downlink information of a first radio link, between the communication apparatus and a terminal device, wherein the downlink information of the first radio link is used by the terminal device to detect a downlink quality of the first radio link;
determine a manner of detecting, by the terminal device, only the first radio link or both of the first radio link and the second radio link;
send configuration information to the terminal device, wherein the configuration information is used to indicate the manner of detecting only the first radio link or both of the first radio link and the second radio link, wherein the manner of detecting only the first radio link or both of the first radio link and the second radio link comprises at least one of:
detecting only the first radio link;
detecting the first radio link, and detecting the second radio link after an access network device is triggered; or
detecting the first radio link and the second radio link; and
broadcast the downlink information of the first radio link to the terminal device over a second radio link between the access device and the terminal device.

14. The communications apparatus according to claim 13, wherein the instructions further cause the communications apparatus to:
receive acknowledgment information from the terminal device, wherein the acknowledgment information is used to indicate that the terminal device is switched from the second radio link to the first radio link.

15. The communications apparatus according to claim 14, wherein the instructions further cause the communications apparatus to:
send downlink information of the second radio link to the terminal device, wherein the downlink information of the second radio link is used by the terminal device to detect a downlink quality of the second radio link.

16. The communications apparatus according to claim 13, wherein the instructions further cause the communications apparatus to:
receive capability information from the terminal device, wherein the capability information is used to indicate that the terminal device has a capability of detecting the second radio link and a capability of detecting the first radio link, or is used to indicate that the terminal device has a capability of detecting the first radio link.

* * * * *